United States Patent
Ito et al.

(10) Patent No.: US 11,422,118 B2
(45) Date of Patent: Aug. 23, 2022

(54) CHROMATOGRAPHIC DATA SYSTEM PROCESSING APPARATUS

(71) Applicant: Hitachi High-Tech Science Corporation, Tokyo (JP)

(72) Inventors: Masahito Ito, Tokyo (JP); Katsutoshi Shimizu, Tokyo (JP)

(73) Assignee: Hitachi High-Tech Science Corporation, Tokyo (JP)

( * ) Notice: Subject to any disclaimer, the term of this patent is extended or adjusted under 35 U.S.C. 154(b) by 942 days.

(21) Appl. No.: 16/191,962

(22) Filed: Nov. 15, 2018

(65) Prior Publication Data
US 2019/0145943 A1 May 16, 2019

(30) Foreign Application Priority Data

Nov. 15, 2017 (JP) .............................. JP2017-219707
Nov. 14, 2018 (JP) .............................. JP2018-225924

(51) Int. Cl.
*G01N 30/86* (2006.01)
*G01N 30/24* (2006.01)
(Continued)

(52) U.S. Cl.
CPC ......... *G01N 30/8693* (2013.01); *G01N 30/24* (2013.01); *G01N 30/74* (2013.01);
(Continued)

(58) Field of Classification Search
CPC .... G01N 30/8693; G01N 30/24; G01N 30/74; G01N 30/861; G01N 30/8651; G01N 30/8658; G01N 2030/027
See application file for complete search history.

(56) References Cited

U.S. PATENT DOCUMENTS

2009/0288473 A1  11/2009  Suzuki et al.
2012/0222470 A1  9/2012  Suzuki et al.

FOREIGN PATENT DOCUMENTS

JP  2009-281897 A  12/2009
WO  2014-030537 A1  2/2014

OTHER PUBLICATIONS

Groskreutz et al., "Graphical Method for Choosing Optimized Conditions Given a Pump Pressure and a Particle Diameter in Liquid Chromatography," Oct. 28, 2016, Analytical Chemistry, American Chemical Society, pp. 11742-11749 + Supplemental, DOI: 10.1021/acs.analchem.6b03368. (Year: 2016).*

(Continued)

*Primary Examiner* — Jennifer Wecker
*Assistant Examiner* — Michael Paul Shimek
(74) *Attorney, Agent, or Firm* — Banner & Witcoff, Ltd.

(57) ABSTRACT

A chromatographic data system processing apparatus includes a liquid feeder, a sample injector, a column that separates samples, a detector, a controller that processes a detected result of the detector, and a data processor that examines and sets operations of the liquid feeder, the column and the detector, and a measurement condition. The data processor generates a three-dimensional graph having three axes related to a pressure, a time, and a number of theoretical plates based on data or variables indicating a relationship between the number of theoretical plates and a flow rate, and data or variables indicating a relationship between the pressure and the flow rate. The chromatographic data system processing apparatus can easily obtain a separation condition for obtaining performance from a three-dimensional graph including a pressure drop, a hold-up time and a number of theoretical plates.

13 Claims, 32 Drawing Sheets

(51) Int. Cl.
*G01N 30/74* (2006.01)
*G01N 30/02* (2006.01)
(52) U.S. Cl.
CPC ....... *G01N 30/861* (2013.01); *G01N 30/8651* (2013.01); *G01N 30/8658* (2013.01); *G01N 2030/027* (2013.01)

(56) References Cited

OTHER PUBLICATIONS

Ito, Masahito, et al. "Three-dimensional Representation Method Using Pressure, Time, and Number of Theoretical Plates to Analyze Separation Conditions in HPLC Columns." Analytical Sciences, vol. 34, No. 2, 2018, pp. 137-142.

Groskreutz, Stephen R., and Weber, Stephen G. "Graphical Method for Choosing Optimized Conditions Given a Pump Pressure and a Particle Diameter in Liquid Chromatography." Analytical Chemistry, vol. 88, No. 23, 2016, pp. 11742-11749.

* cited by examiner

LRT CORRESPONDENCE ($u_0$, L)
(7.5 mm/s, 37 mm)

| $\Delta P$ (MPa) | 20 | 40 | 60 |
|---|---|---|---|
| $t_0$ (s) | 9 | 5 | 4 |
| $\mu_{t/\Pi}$ | 0.94 | 0.65 | 0.54 |
| $\eta_N$ | 0.94 | 0.65 | 0.54 |

Fig. 16

LRT CORRESPONDENCE ($u_0$, L)
(1.9 mm/s, 36 mm)

| $\Delta P$ (MPa) | 10 | 15 | 20 |
|---|---|---|---|
| $t_0$ (s) | 19 | 12 | 9 |
| $\mu_{t/\Pi}$ | 1.39 | 1.09 | 0.94 |
| $\eta_N$ | 0.72 | 0.92 | 0.94 |

Fig. 18

LRT CORRESPONDENCE ($u_0$, L)
(6.5 mm/s, 65 mm)

| ΔP (MPa) | 20 | 40 | 60 |
|---|---|---|---|
| N | 5,350 | 7,400 | 8,800 |
| $\mu_{N/\Pi}$ | 0.96 | 0.80 | 0.71 |
| $\eta_t$ | 0.96 | 0.80 | 0.71 |

Fig. 20

LRT CORRESPONDENCE ($u_0$, L)
(2.6 mm/s, 26 mm)

| $\Delta P$ (MPa) | 10 | 15 | 20 |
|---|---|---|---|
| N | 3,750 | 4,630 | 5,350 |
| $\mu_{N/\Pi}$ | 1.16 | 1.04 | 0.96 |
| $\eta_t$ | 0.86 | 0.96 | 0.96 |

Fig. 22

LRT CORRESPONDENCE ($u_0$, L)
(6.8 mm/s, 20 mm)

| $t_0$ (s) | 3 | 6 | 11 |
|---|---|---|---|
| N | 2,760 | 4,090 | 5,620 |
| $\mu_{N/t}$ | 1.18 | 1.09 | 1.01 |
| $\eta_\Pi$ | 0.85 | 0.92 | 0.99 |

Fig. 24

LRT CORRESPONDENCE ($u_0$, L)
($2.6$ mm/s, $53$ mm)

| $t_0$ (s) | 11 | 15 | 20 |
|---|---|---|---|
| N | 5,620 | 6,540 | 7,490 |
| $\mu_{N/t}$ | 1.01 | 0.96 | 0.92 |
| $\eta_\Pi$ | 0.99 | 0.96 | 0.92 |

Fig. 26

CHROMATOGRAPHIC DATA SYSTEM PROCESSING APPARATUS

CROSS-REFERENCE TO RELATED APPLICATION

This application claims priority from Japanese Patent Application No. 2017-219707 filed on Nov. 15, 2017 and Japanese Patent Application No. 2018-225924 filed on Nov. 14, 2018, the entire subject matters of which is incorporated herein by reference.

BACKGROUND

1. Field of the Invention

The present disclosure relates to a chromatographic data system processing apparatus, and particularly to a quantitative analyzing apparatus for searching a separation condition of a liquid chromatography.

2. Background Art

Literature 1: Masahito ITO, Katutoshi SHIMIZU, and Kiyoharu NAKATANI, "ANALYTICAL SCIENCE", The Japan Society for Analytical Chemistry, February 2018, Vol. 34, p. 137-141

Literature 2: Stephen. R. Groskreutz, and Stephen. G. Weber, "Analytical Chemistry", ACS Publications, 2016, Vol. 88, p. 11742-11749

In order to understand a relationship between an analysis time and separation performance of HPLC (High Performance Liquid Chromatography), the shown-above Literature 1 based on WO 2014/030537 1 can be cited. A pressure drop $\Delta P$ (Pa) and a hold-up time $t_0$ (s) are input as two independent variables, and a number of theoretical plates N is output as one function of N ($\Delta P$, $t_0$) or N ($\Pi$, $t_0$). Essentially, $\Delta P$ corresponds to a next velocity length product $\Pi$ ($m^2$/s) (represented by $C_f$ in WO 2014/030537).

$$\Pi \equiv \frac{K_v \Delta P}{\eta} = u_0 L \quad \text{(Equation 1)}$$

Here, $K_V$ ($m^2$) represents a column permeability, $\rho$ (Pa·s) represents a viscosity, $u_0$ (m/s) represents a linear velocity of a non-retaining component, and L (m) represents a column length.

There is the shown-above Literature 2 for the same purpose. As shown in FIG. 1, the above function N on a z axis is expressed as N ($u_0$, L) by another basal plane. FIG. 1 is a simple three-dimensional graph plotting the linear velocity $u_0$, that is, the number of theoretical plates N obtained when feeding a mobile phase of a flow rate F, to the column length L. For example, in a case of a column with L=50 mm, an N-$u_0$ curve indicated by a broken line is drawn. A maximum point of this curve corresponds to a so-called minimum theoretical plate equivalent height $H_{min}$. A optimal linear velocity at which $H_{min}$ is obtained is $u_{0,opt}$, and $u_{0,opt}$ is an intrinsic value if the separation condition of fillers etc. are kept constant. Therefore, in FIG. 1, a straight line with $u_{0,opt}$=3.5 mm/s is drawn as a vertical broken line connecting the maximum point regardless of L.

An HPLC user generally determines the column length L and then searches for the separation condition by a manipulation of changing the flow rate F. The pressure drop $\Delta P$ and the hold-up time $t_0$ are obtained as measurement results reflecting F and L of the segregation condition searched. It is considered that this separation condition F and L is a cause system. Compared to the separation condition of F and L, $\Delta P$ and $t_0$ are considered to be result indexes obtained therefrom. As described in WO 2014/030537, for example, an analytical operator firstly expects to grasp a relationship between the result indexes $\Delta P$ and $t_0$ and the number of theoretical plates N obtained at that time. In other words, the analytical operator expects to analyze at what degree of $\Delta P$, N indicating a high speed $t_0$ and separation performance can be obtained.

For another example, when identifying each separated analyte for the property of HPLC, since a retention time after establishing the separation condition is used, in actual examination of the separation condition, $t_0$ and the retention time of each analyte are verified.

In addition, a method of searching for a condition by three-dimensional graphing $\Delta P$, $t_0$ and N is proposed (WO 2014/030537). As factors of the separation condition search, $\Delta P$ and $t_0$ can be direct judgment factors, as described above. However, as a related condition examination method, quantitative analysis is difficult for the HPLC user familiar with the column length L and the flow rate F. F is a speed related index that is proportional to the aforementioned $u_0$, and $\Delta P$ is an intensity related potential capability index that is proportional to the aforementioned velocity length product $\Pi$.

In JP-A-2009-281897, transfer methods on how to transfer from HPLC to UHPLC or vice versa are described. Although only $\Delta P$ is considered by an optimization method of L and F, there was a problem that $t_0$ is not sufficiently considered and N cannot be calculated either.

There is also a problem that $\Delta P$, to and N cannot be quantitatively grasped to a physiographic profile of the three-dimensional graph.

SUMMARY

In order to solve the above problems, a chromatographic data system processing apparatus is provided, which can quantitatively analyze $\Delta P$, $t_0$ and N by introducing an efficiency which is a new dimensionless index on a slope of a three-dimensional space representing a column length L, a linear velocity $u_0$ and a number of theoretical plates N, and applying standardization based on an optimum linear velocity $u_{0,opt}$, in other words, which can easily obtain a separation condition for obtaining performance from a three-dimensional graph including $\Delta P$, $t_0$ and N.

In order to solve the above problems, a chromatographic data system processing apparatus according to the present disclosure includes:

a liquid feeder configured to feed a mobile phase;

a sample injector configured to inject a sample into a mobile phase flowing path into which the mobile phase is fed;

a column configured to separate the injected sample;

a detector configured to detect the separated analytes;

a controller configured to process a detected result of the detector;

a data processor configured to examine and set operations of the liquid feeder, the column and the detector, and a measurement condition, in which the data processor generates a three-dimensional graph having three axes related to a pressure, a time, and a number of theoretical plates based on data or variables indicating a relationship between the number of theoretical plates and a flow rate, and data or variables indicating a relationship between the pressure and the flow rate to analyze a separation condition from the generated three-dimensional graph.

In order to solve the above problems, a chromatographic data system processing apparatus, includes:

a liquid feeder configured to feed a mobile phase;

a sample injector configured to inject a sample into a mobile phase flowing path into which the mobile phase is fed;

a column configured to separate the injected sample;

a detector configured to detect the separated analytes;

a controller configured to process a detected result of the detector; and a data processor configured to examine and set operations of the liquid feeder, the column and the detector, and a measurement condition, in which, in a process of selecting two variables for axes from four variables related to a linear velocity, a length, a pressure and a time to analyze a separation condition, the data processor transforms the axes of the selected two variables into axes of two variables not selected.

In order to solve the above problems, a chromatographic data system processing apparatus, which analyzes and processes data of an analysis condition and a detection result of a chromatograph, outputs a three-dimensional graph having three axes related to a pressure, a time, and a number of theoretical plates based on data or variables indicating a relationship between the number of theoretical plates and a flow rate, and data or variables indicating a relationship between the pressure and the flow rate to analyze a separation condition from the output three-dimensional graph.

The present disclosure provides the chromatographic data system processing apparatus for easily transforming a representation form from a three-dimensional graph $T_2$ ($\Pi$, $t_0$, N) representing a result requested as a performance by a user to a causal three-dimensional graph $T_1$ ($u_0$, L, N) to be searched for as a separation condition. This is an LRT (Logarithmically Rotational Transformation) transformation from ($\Pi$, $t_0$) to ($u_0$, L) of a basal coordinate (x, y). $T_1$ and $T_2$ represent three-dimensional partial spaces, where $T_1$ represents a vector space expressed by ($u_0$, L, N), and $T_2$ represents a vector space expressed by ($\Pi$, $t_0$, N).

Next, the chromatographic data system processing apparatus outputs an index PAE (Pressure-Application Efficiency) that a user can quantitatively grasp whether the performance to be obtained is the performance corresponding to application of pressure or whether the inefficient pressure increases. The Pressure-Application Efficiency $\mu_{N/\Pi}$ ($\Pi$, $t_0$) is standardized to 1 when the linear velocity is an optimal $u_{0,opt}$. $\mu_{t/\Pi}$ ($\Pi$, $t_0$) is the PAE for $t_0$ which divides $\mu_{N/\Pi}$ ($\Pi$, $t_0$) by $\mu_{N/t}$ ($\Pi$, $t_0$). Although on a slope on a higher pressure side, i.e., a higher flow rate side than the line of $u_{0,opt}$, the efficiency is 1 or less, the efficiency gradually inclines (changes) and not largely decreases. That is, an increase in number of theoretical plates per pressure can be expected with a good efficiency that is almost equal to an ideal $u_{0,opt}$. For example, as one of guidelines, it is possible to search for a separation condition as a practical range of $\mu_{N/\Pi}$ of 0.5 or more as a practical range as long as a constant separation performance is allowed in a high-speed analysis time area which is not ideal. This is an advantage of quantitatively overlooking $\mu_{N/\Pi}$ in all areas on a basal coordinate ($\Pi$, $t_0$).

BRIEF DESCRIPTION OF THE DRAWINGS

In the accompanying drawings:

FIG. 16 is a diagram showing pressure variation along a contour of N=5,000 in the extension to the (1) high $\Pi$ area in speeding-up of $t_0$ under a constant condition of N;

FIG. 18 is a diagram showing pressure variation along a contour of N=5,000 in the movement to the (1) low $\Pi$ area in speeding-up of $t_0$ under a constant condition of N;

FIG. 20 is a diagram showing pressure variation along a horizontal line of $t_0$=10 s in the extension to the (1) high $\Pi$ area in high separation of N under a constant condition of $t_0$;

FIG. 22 is a diagram showing pressure variation along a horizontal line of $t_0$=10 s in the movement to the (2) low $\Pi$ area in high separation of N under a constant condition of $t_0$;

FIG. 24 is a diagram showing time variation along a vertical line of ΔP=20 MPa in the (1) speeding-up in the deployment under a $\Pi_{max}$ upper limit pressure;

FIG. 26 is a diagram showing time variation along a vertical line of ΔP=20 MPa in (1) high separation in the deployment under a $\Pi_{max}$ upper limit pressure;

DETAILED DESCRIPTION

Hereinafter, the Literature 1 and the Literature 2 will be mathematically unified, and disclosures according to an invention devised from the understanding based on the mathematical unification will be shown.

(1) Bidirectional Transformation Method LRT

As one of the disclosures, Logarithmically Rotational Transformation (LRT) based on a logarithmic axis representation such as log Π.

$t_0$ described above is expressed by Equation 2 using the variables $u_0$ and L in the above Equation 1.

$$t_0 = \frac{L}{u_0} \quad \text{(Equation 2)}$$

The Equations 1 and 2 are logarithmic representations and can be represented into Equations 3 and 4.

$$\log \Pi = \log u_0 L = \log u_0 + \log L \quad \text{(Equation 3)}$$

$$\log t_0 = \log\left(\frac{L}{u_0}\right) = -\log u_0 + \log L \quad \text{(Equation 4)}$$

Equations 3 and 4 can be represented in a matrix notation and can be regarded as a kind of axis rotational transformation (Equation 5).

$$\begin{pmatrix} \log \Pi \\ \log t_0 \end{pmatrix} = \begin{pmatrix} 1 & 1 \\ -1 & 1 \end{pmatrix} \begin{pmatrix} \log u_0 \\ \log L \end{pmatrix}$$
$$= \sqrt{2} \begin{pmatrix} \cos 45° & \sin 45° \\ -\sin 45° & \cos 45° \end{pmatrix} \begin{pmatrix} \log u_0 \\ \log L \end{pmatrix}$$

Figure 2:
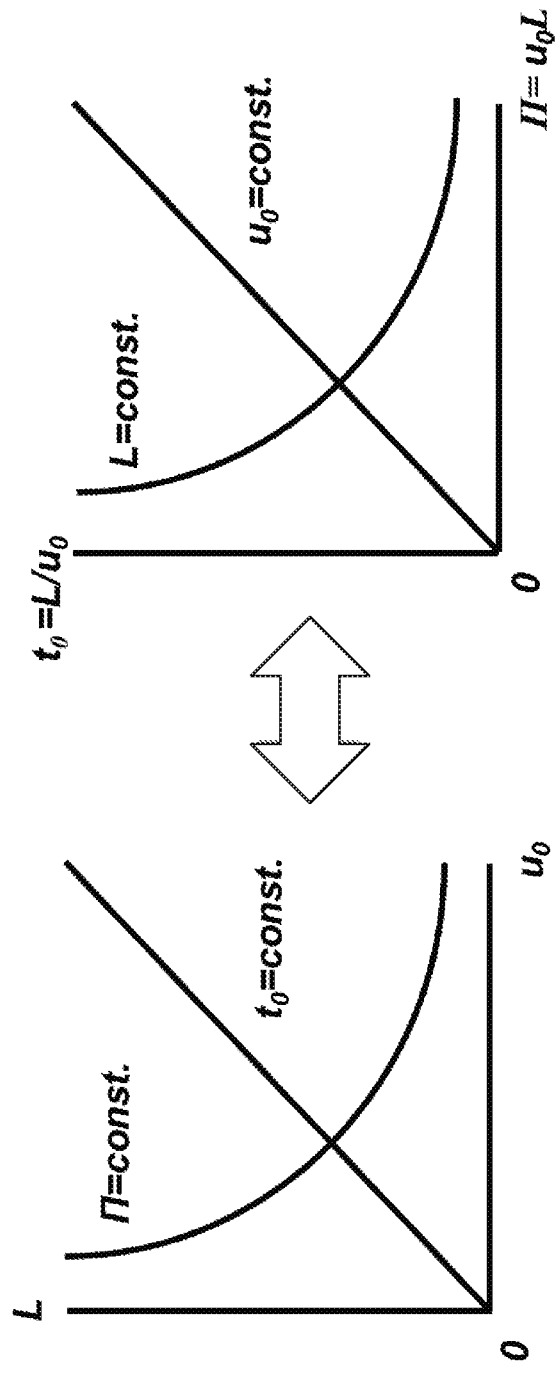
FIG. 2 is a diagram showing bidirectional transformation between ($u_0$, L) and ($\Pi$, $t_0$)
Figure 3:
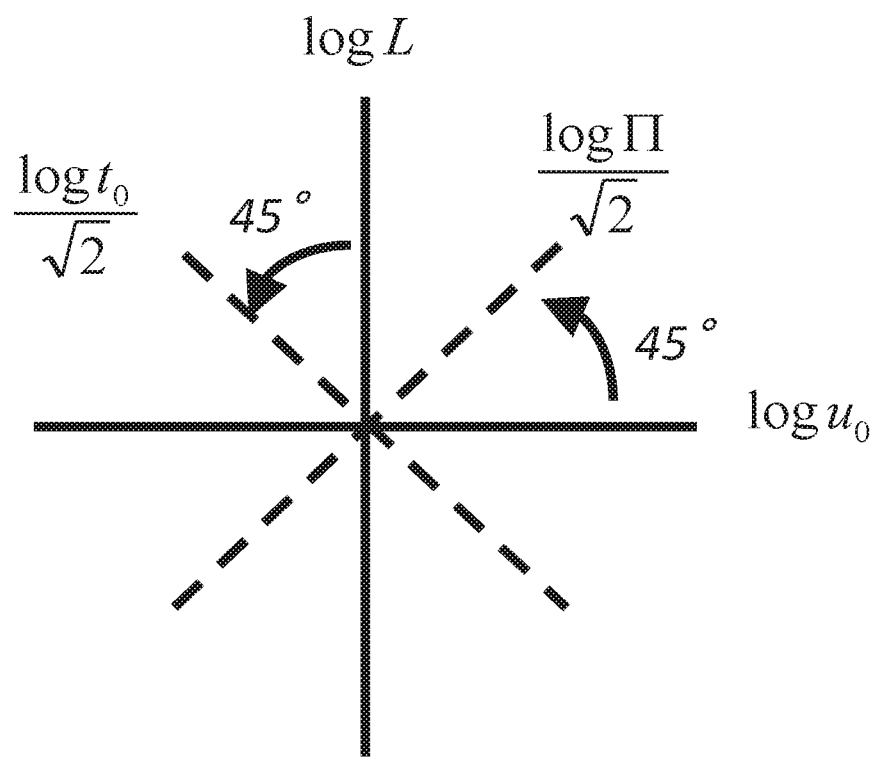
FIG. 3 is a diagram showing transformations of axis rotation and scaling in an LRT.

This means that N ($u_0$, L) can rotate to N (Π, $t_0$) through a logarithm, that is, coordinate conversion can be performed. Since the logarithm can be returned to an antilogarithm, it is a one-to-one mapping from a basal plane ($u_0$, L) to a basal plane (Π, $t_0$), and vice versa. Precisely, it is a bijective linear transformation that multiplies the rotational transformation by a scalar magnification √2. It is regarded that the three-dimensional graph of N ($u_0$, L) is different from the three-dimensional graph of N (Π, $t_0$) only in the axis to be expressed, and contents to be expressed are equivalent. However, this relationship is an intuitive representation for the first time being represented on the logarithmic axis. Mathematically, from an idea that links a relationship of a mathematical product and a quotient between $u_0$ and L to a relationship of a sum and a difference between them through logarithm, a representation easy to understand can be obtained. In the Literature 1, a target is considered to be a five-dimensional space V ($u_0$, L, Π, $t_0$, N), but according to the present disclosure, the target is divided into two three-dimensional partial spaces $T_1$ ($u_0$, L, N) and $T_2$ (Π, $t_0$, N), as shown in FIG. 2. In addition, as shown in FIG. 3, each partial space is found to be easily transferable as indicated by the LRT transformation of $T_1$<->$T_2$ (bidirectional transformation between $T_1$ and $T_2$).

As for the way to see chromatography, $T_1$ ($u_0$, L, N) is a space represented by a three-dimensional graph showing N obtained by first fixing separation conditions such as a mobile phase, an analytical specie and a column temperature under a precondition of an optional column filler and freely changing $u_0$ and L. In response to this, $T_2$ (Π, $t_0$, N) is a transformation destination from the basal coordinate of $u_0$ and L to the basal coordinate Π and $t_0$. That is, two-dimensional degrees of freedom of $u_0$ and L are inherited to all degrees of freedom of Π and $t_0$. If there is a certain column, L is constant but $u_0$ is variable. It is understood that, if $u_0$ is moved, not only to but also Π changes accordingly, so that all sets of $u_0$ and L correspond to sets of Π and $t_0$.

WO 2014/030537 describes KPA (Kinetic Plot Analysis), that is, KPL (Kinetic Performance Limit). KPL can be regarded as representing a cross section ($t_0$, N) at a certain Π when $T_2$ (Π, $t_0$, N) is cut with the certain Π. When $u_0$ is changed using a column of a certain L, the N ($u_0$) curve at the certain L is drawn on a ($u_0$, N) plane of the certain L. Further, a $T_1$ ($u_0$, L, N) space is obtained by sweeping the above L. Since it is a surjection from $T_1$ ($u_0$, L, N) to $T_2$ (Π, $t_0$, N), it is clearly determined that a set of ($u_0$, L) to a set of (Π, $t_0$) is a one-to-one correspondence. That is, a two-dimensional graph ($t_0$, N) indicated by KPL is a cross section ($t_0$, N) of a certain Π in the ($t_0$, N) space, and each point indicated by a curve N ($t_0$) or $t_0$ (N) of the specific Π expressed by KPL always goes back to coordinates somewhere in the original $T_1$ ($u_0$, L, N) space. The mapping point of the $T_2$ (Π, $t_0$, N) space never goes out of the $T_1$ ($u_0$, L, N) space and never duplicates. KPL is a cross section in the $T_2$ (Π, $t_0$, N) space at a specific Π, and original elements thereof are necessarily provided in advance in the $T_1$ ($u_0$, L, N) space.

Figure 4:
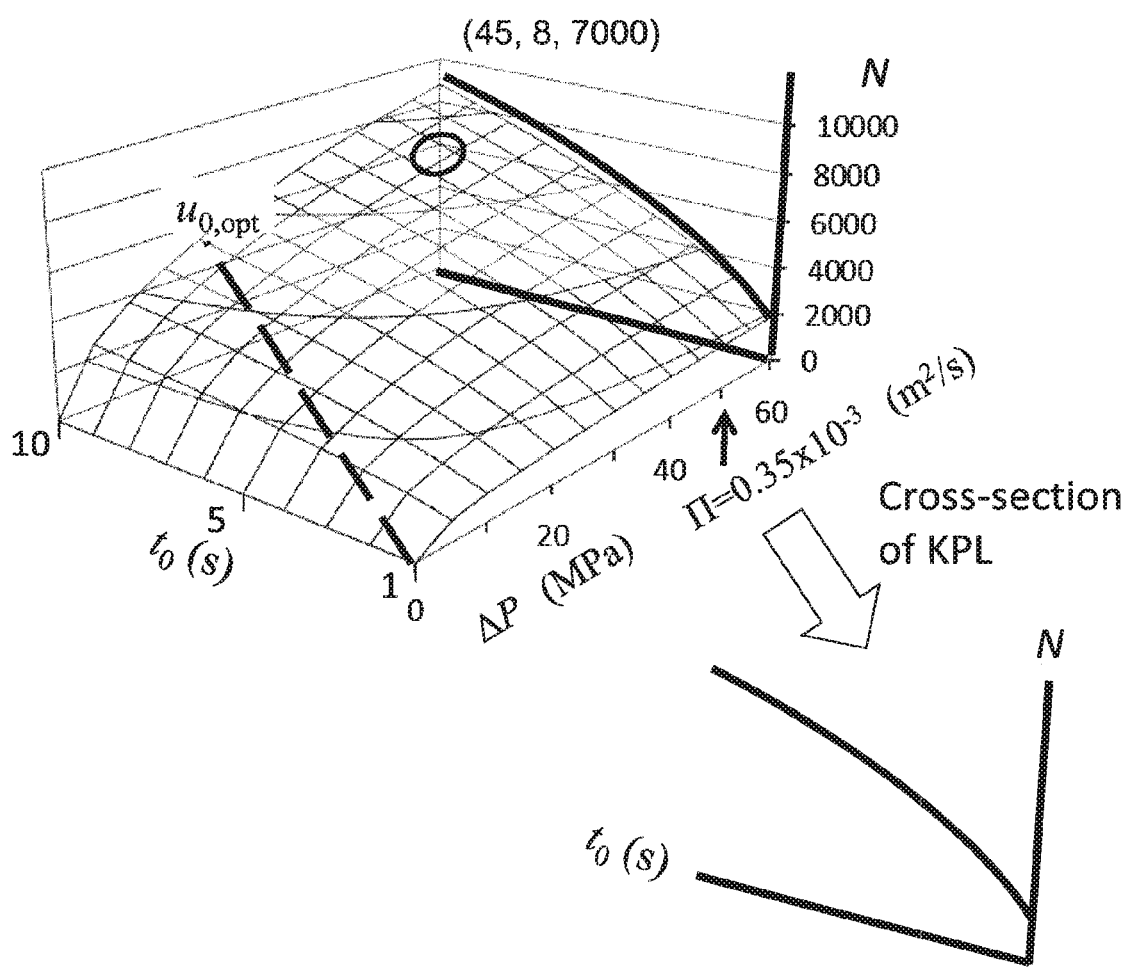
FIG. 4 is a diagram showing a relationship of a three-dimensional graph N ($\Pi$, $t_0$) and KPL of a particle diameter of 2 μm and an output example of the liquid chromatographic separation condition analysis of the present disclosure.

In FIG. 4, a three-dimensional graph of N (Π, $t_0$) is plotted. This is transformed from FIG. 1 by LRT. First, a constant straight line of $u_{0,opt}$ is drawn with a broken line on this three-dimensional graph. Next, for example, when ΔP=60 MPa, that is, Π is constant, a cross section of $t_0$-N is cut off. This is a performance characteristic diagram of a high speed $t_0$ and high separation performance N obtained by KPL. In other words, the three-dimensional graph of N (Π, $t_0$) can be regarded as an extended representation of KPL as described in WO 2014/030537.

A circle shown on the three-dimensional graph in FIG. 4 represents candidate measurement conditions for efficiently proceeding measurement when a column filler has a particle diameter of 2 μm.

It can be understood that this is a reversible relationship indicating a transfer from a resultant $T_2$ representation form required as performance to a causal representation form of $T_1$ to be answered as a separation condition or a transfer in a reverse direction. The LRT can easily provide the basal coordinates of $\Pi$ and $t_0$, which can be obtained as a result that an analysis operator cannot immediately estimate by just looking at the cause setting variables $u_0$ and L. Here, the basal coordinate referred to corresponds to a basal plane of a three-dimensional graph. z on a vertical axis is set as N, and the basal coordinate (x, y) is ($u_0$, L) or ($\Pi$, $t_0$).

Further, since the column length L available to general users is discrete as 50 mm, 100 mm, and 150 mm, there is an advantage that a cause input L of $T_1$ can be discretely expressed and $u_0$ can be evaluated continuously can be evaluated. Since this $T_1$ can be LRT-transformed to a three-dimensional graph of $T_2$, a discrete representation can correspond to the $T_2$ graph one-to-one, as a performance result. This is a very convenient representation for the users as a real solution. The operation and representation form of a chromatography data system (CDS) related to these three-dimensional graphs can correspond not only to a bidirectional transformation of LRT but also a bidirectional transformation between a logarithm and an antilogarithm and a discrete representation of L. In addition, when the user indicates an arbitrary point on the three-dimensional graph, three sets of values of ($u_0$, L, N) and ($\Pi$, $t_0$, N) can be shown. When arbitrary two points are indicated, a difference between the three axial directions can also be expressed. For example, an increment of N is an increment of $\Pi$ and $t_0$.

(2) Generalized Representation Form

The logarithmically rotational transformation LRT is generalized and extended. Variables are generalized with $x_i$ and four variables of i=1, 2, 3, 4 are introduced when $x_1=u_0$, $x_2=L$, $x_3=\Pi$, and $x_4=t_0$. In the four variables, Equation 1 and Equation 2, that is, Equation 6 and Equation 7, have a subordination relationship, and since there are four variables and two equations, there two independent variables. The number of combinations of selecting two variables from the four variables is 6 of $_4C_2$.

$$x_3 = x_1 x_2 \quad \text{(Equation 6)}$$

$$x_4 = \frac{x_2}{x_1} x_1^{-1} x_2 \quad \text{(Equation 7)}$$

In addition, when making a three-dimensional graph, two independent variables can be assigned to a first dimension axis and a second dimension axis, such as a basal coordinate ($x_i$, $x_j$). At this time, if the order of the first dimension axis and the second dimension axis is distinguished, there are 12 combinations of the permutation number $_4P_2$. As described above, a logarithmic representation such as log $x_1$ can be used for the basal coordinate. Up to here, the z axis is discussed with respect to N, but other functions can be introduced as a similar basal plane approach. In order to extend to $t_E^{-1}$ and $E^{-1}$ E-1, a $z_k$ representation wherein k=1, 2, 3, 4, ..., etc., is introduced and it can be defined that $z_1=N$, $z_2=t_E^{-1}$, $z_3=E^{-1}$, and $z_4=t_P^{-1}$. For example, it is represented that $z_1=N$ ($x_3$, $x_4$), and $z_2=t_E^{-1}$ ($x_1$, $x_2$). The reason why there are indexes expressed by reciprocals is to unify and impress as an optimization problem that maximizes the axis above the objective function $z_k$. As $z_k$, $H^{-1}$, $H^{-2}$, $H^{-3}$, ..., etc., which are simply powers and reciprocals of H, $H^2$, $H^3$, ..., etc., can also be adopted. Further, an arbitrary index that multiplies each of the basal coordinates $x_i$, $x_j$, ..., etc., can also be adopted.

$$z_1 = N = \frac{L}{H(u_0)} = \frac{u_0 t_0}{H(u_0)} \quad \text{(Equation 8)}$$

$$z_2 = t_E^{-1} \quad \text{(Equation 9)}$$
$$= \frac{N^2}{t_0}$$
$$= \frac{L^2}{t_0 \{H(u_0)\}^2}$$
$$= \frac{u_0^2 t_0}{\{H(u_0)\}^2}$$
$$= \frac{u_0 L}{\{H(u_0)\}^2}$$
$$= \frac{\Pi}{\{H(u_0)\}^2}$$

$$z_3 = E^{-1} = \frac{K_V}{\{H(u_0)\}^2} \quad \text{(Equation 10)}$$
$$E = \frac{\{H(u_0)\}^2}{K_V}$$

$$z_4 = t_P^{-1} = \frac{N}{t_0} = \frac{L}{t_0 H(u_0)} = \frac{u_0}{H(u_0)} \quad \text{(Equation 11)}$$

From Equation 8, N is a function proportional to L, and also from the Equations 1 and 2, $\Pi$ and $t_0$ are also functions proportional to L, respectively. That is, in the three-dimensional graph ($\Pi$, $t_0$, N), L can be regarded as one of extensive variables.

$t_E$ is a time obtained by dividing $t_0$ by $N^2$, and represents an impedance time, and $t_P$ is a time obtained by dividing $t_0$ by N and represents a plate time.

(3) New Index Based on Partial Differential Coefficient

On the other hand, the slop in each direction of the basal coordinate axis, that is, the partial differential coefficient, when N ($\Pi$, $t_0$) is represented by the curved surface of the three-dimensional graph can be taken as a specific determination evaluation index.

First, simply, the slope of N with respect to the change of $\Pi$ when $t_0$ is constant in the three-dimensional graph N ($\Pi$, $t_0$) is a partial differential coefficient $c_{N/\Pi}$ (Equation 12). $c_{N/\Pi}$ ($\Pi$, $t_0$) indicating a simple slop is set as a slope of the curved surface in the three-dimensional graph, which is a function in which $t_0$ is fixed with a partial differential coefficient, an N increment per $\Pi$ is denoted, and a dimension is included, and is defined over the entire basal coordinate.

$$c_{N/\Pi}(\Pi, t_0) \equiv \left(\frac{\partial N}{\partial \Pi}\right)_{t_0} \quad \text{(Equation 12)}$$

A general mathematical representation can be made as shown in Equation 13 from the properties of partial differential coefficient.

$$z = xy \quad \text{(Equation 13)}$$
$$\left(\frac{\partial z}{\partial x}\right)_y = y = \frac{z}{x}$$

Here, x, y, and z are variables, l, n, and m are constants, and can be similarly expanded to Equation 14.

$$z = lx^n y^m \quad \text{(Equation 14)}$$
$$\left(\frac{\partial z}{\partial x}\right)_y = nlx^{n-1}y^m = n\frac{z}{x}$$

(4) Introduction of Impedance Time

According to the Literature 2 or the like, the impedance time $t_E$ can be introduced, and the reciprocal thereof is re-indicated here as Equation 15 as shown in Equation 9 above.

$$t_E^{-1} \equiv N^2 t_0^{-1} = \frac{\Pi}{\{H(u_0)\}^2} \quad \text{(Equation 15)}$$

On the other hand, a theoretical plate equivalent height H ($u_0$) is obtained from a minimum and best theoretical plate equivalent height $H_{min} = H (u_{0,opt})$ with the optimal linear velocity $u_{0,opt}$. When $u_0 = u_{0,opt}$, Equation 16 is obtained by using this constant $H_{min}$.

$$\Pi = H_{min}^2 N^2 t_0^{-1} \quad \text{(Equation 16)}$$

As compared Equation 16 with a general formula (Equation 14), a coefficient n=2 appears and a representation of Equation 17 is obtained. Equation 11 in which the coefficient n=2 has a feature is limited when $u_0 = u_{0,opt}$, and $H_{min}$ is offset in the calculation process.

$$\left(\frac{\partial \Pi}{\partial N}\right)_{t_0} = 2\frac{\Pi}{N} = \frac{1}{c_{N/\Pi}} \quad \text{(Equation 17)}$$

Here, $c_{N/\Pi}$ is a partial differential coefficient value defined by Equation 12. When $c_{N/\Pi} (\Pi, t_0)$ is expressed as a function defined by the basal coordinates, the form of Equation 18 is obtained.

$$2c_{N/\Pi}(\Pi, t_0) = \frac{N(\Pi, t_0)}{\Pi} \quad \text{(Equation 18)}$$

Here, since $u_{0,opt}$ constant conditions are imposed, in fact, $\Pi$ and $t_0$ cannot move on the basal plane of the whole coordinate area freely, and are constrained by the rule of Equation 19 by the L of a medium extensive variable by the Equations 1 and 2.

$$\Pi t_0 = L^2 \quad \text{(Equation 19)}$$

Up to here, although being limited to the constant $H_{min}$ under the optimal condition $u_{0,opt}$, the basal coordinate must be extended to ($\Pi$, $t_0$) the whole area in order to extend to the real solution. $\mu_{N/\Pi}$ as a kind of new adjustment factor devised from Equations 12 and 17 is introduced (Equation 20). $\mu_{N/\Pi}$ is equal to 1 for the optimal condition $u_0 = u_{0,opt}$, but is standardized so as to be a value other than 1 in other basal coordinate areas. Accordingly, $\mu_{N/\Pi}$ can be used as an index such as efficiency. As a result, $\mu_{N/\Pi}$ is a dimensionless standardization factor and has the ability to adjust to obtain the value $c_{N/\Pi}$ of Equation 17 obtained by using $H_{min}$ only in the case of $u_{0,opt}$.

(5) PAE (Pressure-Application Efficiency)

The following function $\mu_{N/\Pi} (\Pi, t_0)$ is defined as a Pressure-Application Efficiency (PAE) (Equation 20). By comparing the function with Equation 18, the position of $\mu_{N/\Pi}$ can be understood. $\mu_{N/\Pi} (\Pi, t_0)$ is a function defined by basal coordinates.

$$2\left(\frac{\partial N}{\partial \Pi}\right)_{t_0} \equiv \mu_{N/\Pi} \frac{N}{\Pi} \quad \text{(Equation 20)}$$

Equation 18 is an ideal equation that holds only when $u_0 = u_{0,opt}$. That is, although Equation 18 does not hold in the case of $u_0$ other than $u_{0,opt}$, Equation 21 having a form close to Equation 18 can be expressed by introducing an adjustment factor $\mu_{N/\Pi}$ as a transformation of ideas.

$$2c_{N/\Pi}(\Pi, t_0) = \mu_{N/\Pi}(\Pi, t_0) \frac{N(\Pi, t_0)}{\Pi} \quad \text{(Equation 21)}$$

The way to obtain the actual $\mu_{N/\Pi}$ ($\Pi$, $t_0$) is to first obtain the slope $c_{N/\Pi}$ ($\Pi$, $t_0$) of the three-dimensional graph at each point of the basal coordinate ($\Pi$, $t_0$), and multiply each by a coefficient 2. Next, $\mu_{N/\Pi}$ ($\Pi$, $t_0$) is obtained by multiplying $\Pi$ of the basal coordinate thereof and dividing by N ($\Pi$, $t_0$) of the coordinate (Equation 21).

Similarly, the Time-Extension Efficiency ($TE^2$) can also be defined as $\mu_{N/t}$ ($\Pi$, $t_0$) (Equation 22).

$$2\left(\frac{\partial N}{\partial \Pi}\right)_{\Pi} \equiv \mu_{N/t} \frac{N}{t_0} \quad \text{(Equation 22)}$$

It is described that the z axis is a special direction to the basal plane, but mathematically simply expresses the slope of the curved surface in the three-dimensional graph from a different perspective. Therefore, PAE for hold-up time $t_0$ can also be defined as $\mu_{t/\Pi}$ ($\Pi$, $t_0$) (Equation 23). In other words, the above PAE is considered to be PAE for the number of theoretical plates N (Equation 20).

$$\left(\frac{\partial t_0}{\partial \Pi}\right)_N = -\mu_{t/\Pi} \frac{t_0}{\Pi} \quad \text{(Equation 23)}$$

Here, an explanation of the doctrine of equivalents will be added. Since the pressure drop $\Delta P$ and the velocity length product $\Pi$ or the general term pressure P are proportional to each other, it is considered that all the discussions around this, which are regarded as ratios, are equivalent. Similarly, the retention time $t_R$ and the hold-up time $t_0$ have the same relationship, and can be used equivalently if careful consideration is given to the retention factor and the gradient elution. The flow rate and the linear velocity $u_0$ can also be used equivalently as long as it is understood that the flow rate and the linear velocity $u_0$ correspond to the porosity and cross-sectional area of the column, respectively.

In the context of the present disclosure, there is an abstract and ideal discussion modeling, and the present disclosure is built on a mathematical pressure driven HPLC model composed and defined only by H ($u_0$) and $K_V$.

(6) Generalization of Partial Differential Coefficient System

Representations based on the following generalization are also possible. Equation 24 holds at the time of $u_{0,opt}$.

$$\left(\frac{\partial x_i}{\partial z_k}\right)_{x_j} = \frac{x_i}{nz_k} = \frac{1}{c_{k/i}} \quad \text{(Equation 24)}$$

Here, $c_{k/j}$ is predefined as Equation 25.

$$c_{k/i} \equiv \left(\frac{\partial z_k}{\partial x_i}\right)_{x_j} \qquad \text{(Equation 25)}$$

Next, a dimensionless efficiency $\mu_{k/i}$ is defined as Equation 26 as described above. At the time of $u_{0,opt}$, $\mu_{k/i}$ is standardized to 1. The coefficient n is the degree derived from Equation 9.

$$n\left(\frac{\partial z_k}{\partial x_i}\right)_{x_j} \equiv \mu_{k/i} \frac{z_k}{x_i} \qquad \text{(Equation 26)}$$

Here, when obtaining a partial differential coefficient, the variable $x_j$ of a suffix j is fixed and Equation 27 can be represented.

$$nc_{k/i} = \mu_{k/i} \frac{z_k}{x_i} \qquad \text{(Equation 27)}$$

In addition, $\mu_{k/i}$ is obtained in the entire area of the basal coordinate as Equation 28.

$$\mu_{k/i}(x_i, x_j) = n\frac{x_i}{z_k} c_{k/i}(x_i, x_j) \qquad \text{(Equation 28)}$$

In terms of total differentiation, the function N can be represented by Equation 29 using partial differential coefficients.

$$\begin{aligned} dN &= \left(\frac{\partial N}{\partial \Pi}\right)_{t_0} d\Pi + \left(\frac{\partial N}{\partial t_0}\right)_\Pi dt_0 \\ &= c_{N/\Pi} d\Pi + c_{N/t} dt_0 \\ &= n\mu_{N/\Pi} \frac{N}{\Pi} d\Pi + m\mu_{N/t} \frac{N}{t_0} dt_0 \\ &= \frac{1}{2}\mu_{N/\Pi} \frac{N}{\Pi} d\Pi + \frac{1}{2}\mu_{N/t} \frac{N}{t_0} dt_0 \end{aligned} \qquad \text{(Equation 29)}$$

Here, it is expressed as Equation 30, and n=½, and m=½.

$$N = \frac{\Pi^{\frac{1}{2}} t_0^{\frac{1}{2}}}{H_{min}} \qquad \text{(Equation 30)}$$

Since $\mu_{k/j}$ is mathematically derived from the slope of the curved surface in the three-dimensional graph, there is a relationship of Equation 31. If two independent variables and the three axes of the function z are mathematically handled without distinction, $\mu_{t/\Pi}$ derived from the slope obtained by fixing N can also be calculated.

$$\mu_{N/t}(x_i, x_j) = \frac{\mu_{N/\Pi}(x_i, x_j)}{\mu_{t/\Pi}(x_i, x_j)} \qquad \text{(Equation 31)}$$

For example, if being locally constant, $\mu_{t/\Pi}$ can be integrated as shown in Equation 32.

$$2\int_{N_1}^{N_2} \frac{1}{N} dN = \mu_{N/\Pi} \int_{\Pi_1}^{\Pi_2} \frac{1}{\Pi} d\Pi \qquad \text{(Equation 32)}$$

$$2\log\frac{N_2}{N_1} = \mu_{N/\Pi} \log\frac{\Pi_2}{\Pi_1}$$

$$\left(\frac{N_2}{N_1}\right)^2 = \left(\frac{\Pi_2}{\Pi_1}\right)^{\mu_{N/\Pi}} = \left(\frac{\Delta P_2}{\Delta P_1}\right)^{\mu_{N/\Pi}}$$

Similarly, $\mu_{t/\Pi}$ can also be represented exponentially (Equation 33).

$$\frac{t_2}{t_1} = \left(\frac{\Pi_2}{\Pi_1}\right)^{-\mu_{t/\Pi}} = \left(\frac{\Pi_1}{\Pi_2}\right)^{\mu_{t/\Pi}} = \left(\frac{\Delta P_1}{\Delta P_2}\right)^{\mu_{t/\Pi}} \qquad \text{(Equation 33)}$$

Further, it is expanded to a partial differential coefficient system as a series when k of $z_k$ equals to 5, 6, 7, ..., $c_{N/\Pi}$ to $z_5$, $\mu_{N/\Pi}$ to $z_6$ can also be expanded sequentially as a three-dimensional graph.

(7) Van Deemter Equation

The Van Deemter equation is used to demonstrate concrete calculations (Equation 34).

$$H(u_0) = A + B\frac{1}{u_0} + Cu_0 \qquad \text{(Equation 34)}$$

This obtains regression coefficients A, B, and C by curve-fitting several experimental values of an H-$u_0$ plot. The H-$u_0$ profile is generated due to factors such as physical diffusion, but in the present disclosure $K_V$ and Equation 34 are used as a curved surface profile generator for generating a three-dimensional graph.

Figure 5:
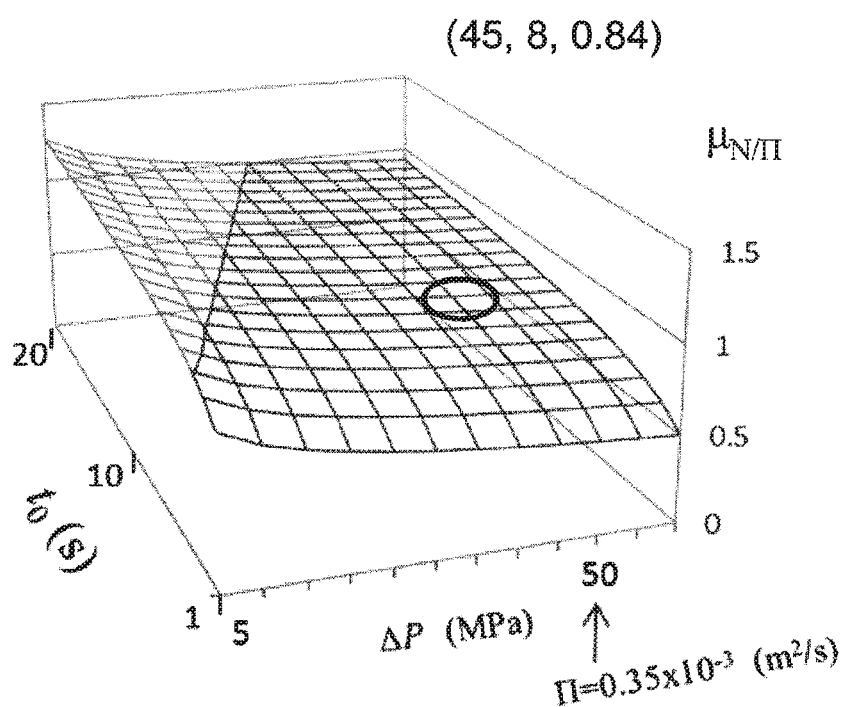
FIG. 5 is a diagram showing a three-dimensional graph of $\mu N/\Pi$ (in a case of a particle diameter of 2 μm) and an output example of the liquid chromatographic separation condition analysis of the present disclosure.

As shown in FIG. 5, PAE for N can be expressed by A, B, and C using Equation 34.

$$\mu_{N/\Pi} = \qquad \text{(Equation 35)}$$
$$2\left(\frac{\partial N}{\partial \Pi}\right)_{t_0} \frac{\Pi}{N} = \frac{\Pi}{t_0}\left(\frac{Au_0 + 2B}{Au_0^3 + Bu_0^2 + Cu_0^4}\right) = \frac{Au_0 + 2B}{Au_0 + B + Cu_0^2}$$

At the time of $u_{0,opt}$, surely $\mu_{N/\Pi} = 1$.

$$\mu_{N/\Pi} = \frac{Au_{0,opt} + 2B}{Au_{0,opt} + B + C\left(\frac{B}{C}\right)} = 1 \qquad \text{(Equation 36)}$$

Here, $$u_{0,opt} = \sqrt{\frac{B}{C}} \text{ is obtained.} \qquad \text{(Equation 37)}$$

Figure 6:
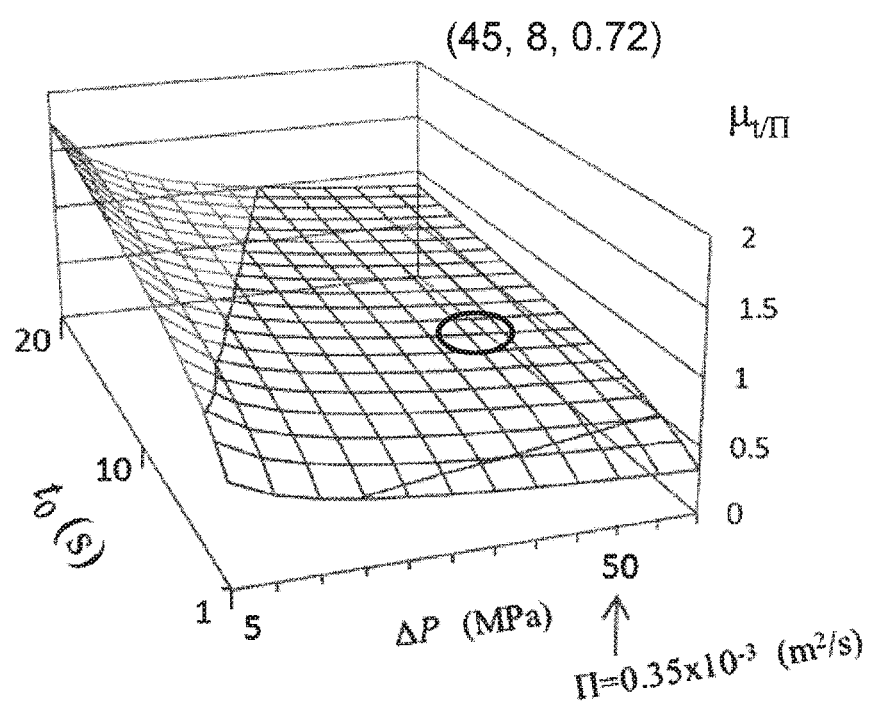
FIG. 6 is a diagram showing a three-dimensional graph of $\mu t/\Pi$ (in a case of a particle diameter of 2 μm) and an output example of the liquid chromatographic separation condition analysis of the present disclosure.

On the other hand, PAE for $t_0$ is shown in FIG. 6.

$$\mu_{t/\Pi} = \frac{-\Pi}{t_0}\left(\frac{\partial t_0}{\partial \Pi}\right)_N = \frac{\Pi}{t_0}\left(\frac{Au_0 + 2B}{Au_0^3 + 2Cu_0^4}\right) = \frac{Au_0 + 2B}{Au_0 + 2Cu_0^2} \qquad \text{(Equation 38)}$$

At the time of $u_{0,opt}$, similarly $\mu_{t/\Pi}=1$.

$$\mu_{t/\Pi} = \frac{Au_{0,opt} + 2B}{Au_{0,opt} + 2C\left(\frac{B}{C}\right)} = 1 \qquad \text{(Equation 39)}$$

All three-dimensional graphs in FIGS. 4 to 6 express the basal coordinates with $z_k$ ($\Pi$, $t_0$), but if the LRT transformation is to be used, the representation can be converted to the representation of $z_k$ ($u_0$, L). In addition, the reverse representation graph of $z_k$ ($u_0$, L) can be easily converted to $z_k$ ($\Pi$, $t_0$) by LRT.

$\mu_{N/\Pi}$ ($\Pi$, $t_0$) is 1 at when the linear velocity is the optimal $u_{0,opt}$. Although the slope of higher pressure is less than 1, it is not merely a gentle slope and not a large decrease in efficiency. That is, an increase in number of theoretical plates per pressure can be expected with a good efficiency that is almost equal to an ideal $u_{0,opt}$. For example, as one of guidelines, it is possible to search for a separation condition as a practical range of $\mu_{N/\Pi}$ of 0.5 or more as a practical range as long as the separation is allowed in a high-speed analysis time area which is not ideal. This is an advantage of quantitatively overlooking using $\mu_{N/\Pi}$ in the basal coordinate ($\Pi$, $t_0$).

On the other hand, the slope on the low pressure side of $\mu_{N/\Pi}$ ($\Pi$, $t_0$)=1 is greater than 1, which seems to be efficient at first sight, but this is not necessarily the case. The reason for showing excessive efficiency means that it is easy to reach $\mu_{N/\Pi}$ ($\Pi$, $t_0$)=1 by setting a better set of L and $u_0$. In the case of one or more slopes, it is relatively easy to increase N more than $u_{0,opt}$ if it is a set of L and $u_0$ which increases the pressure slightly.

An index such as $\mu_{N/\Pi}$ is a dimensionless ratio that standardizes a value at the time of $u_{0,opt}$ to 1. In addition, in the case of exceeding 1, it may be better to refer to a Pressure-Application Coefficient (PAC) rather than efficiency.

Examples

Examples of the present disclosure will be described in detail with reference to the drawings.

Figure 12:
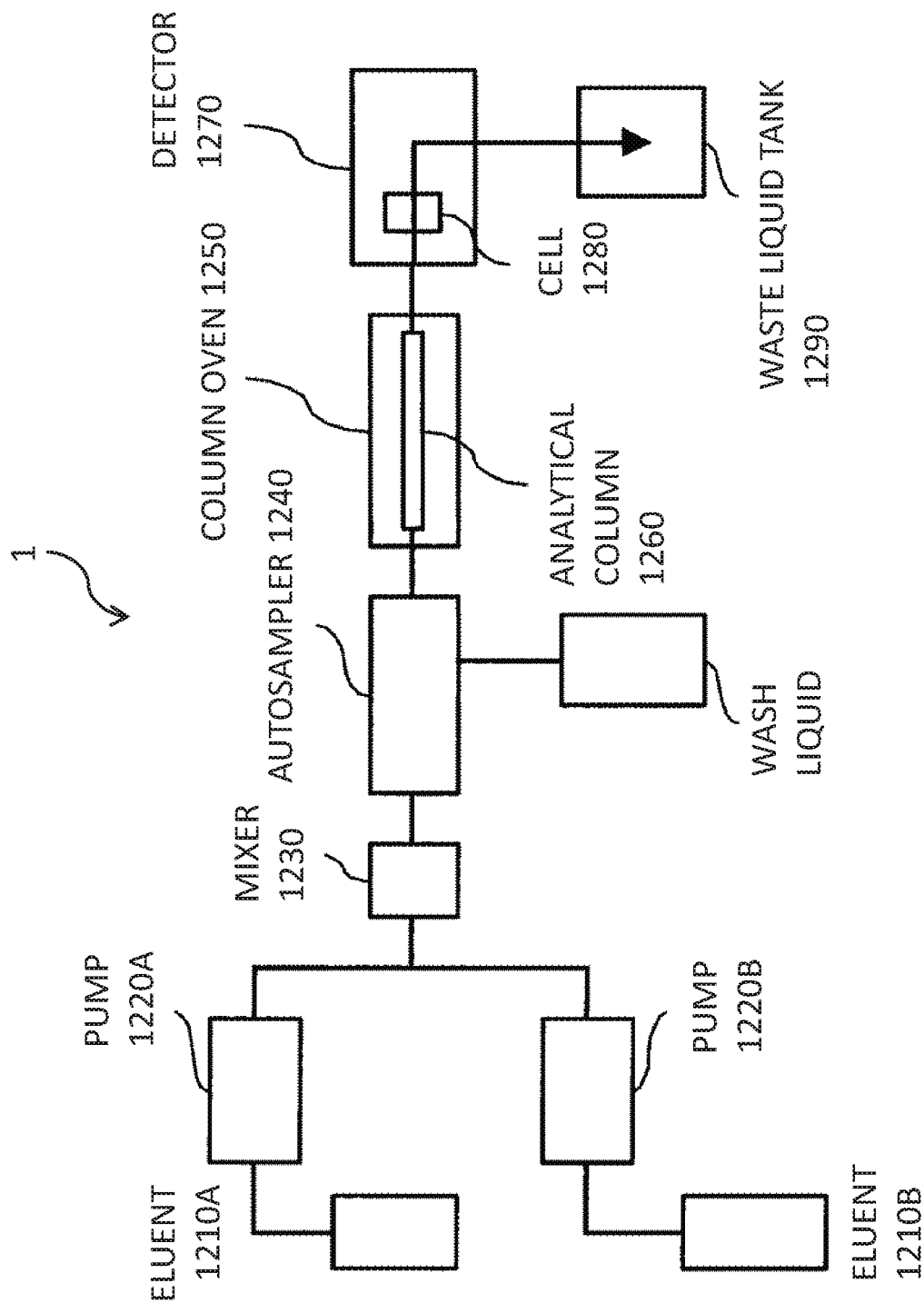
FIG. 12 is a diagram showing an example of a liquid chromatography apparatus.

In FIG. 12, a pump 1220A that carries an eluent (mobile phase) 1210A and a pump 1210B that carries an eluent (mobile phase) 1210B are included, and the eluent 1210A and the eluate 1210B fed by the pumps are mixed by a mixer 1230. The pump 1220A and the pump 1220B can also perform gradient feeding. The eluent mixed by the mixer 1230 is fed to an analytical column 1260 together with a sample injected by an autosampler 1240. The analytical column 1260 includes a column oven 1250 that regulates the column temperature.

In the analytical column 1260, the sample is separated for each analyte and sent to a detector 1270. Light is irradiated in a cell 1280 of the detector 1270, and a waveform of the chromatogram is obtained from the signal intensity. The sample and the eluent are then sent to a waste liquid tank 1290.

Figure 13:
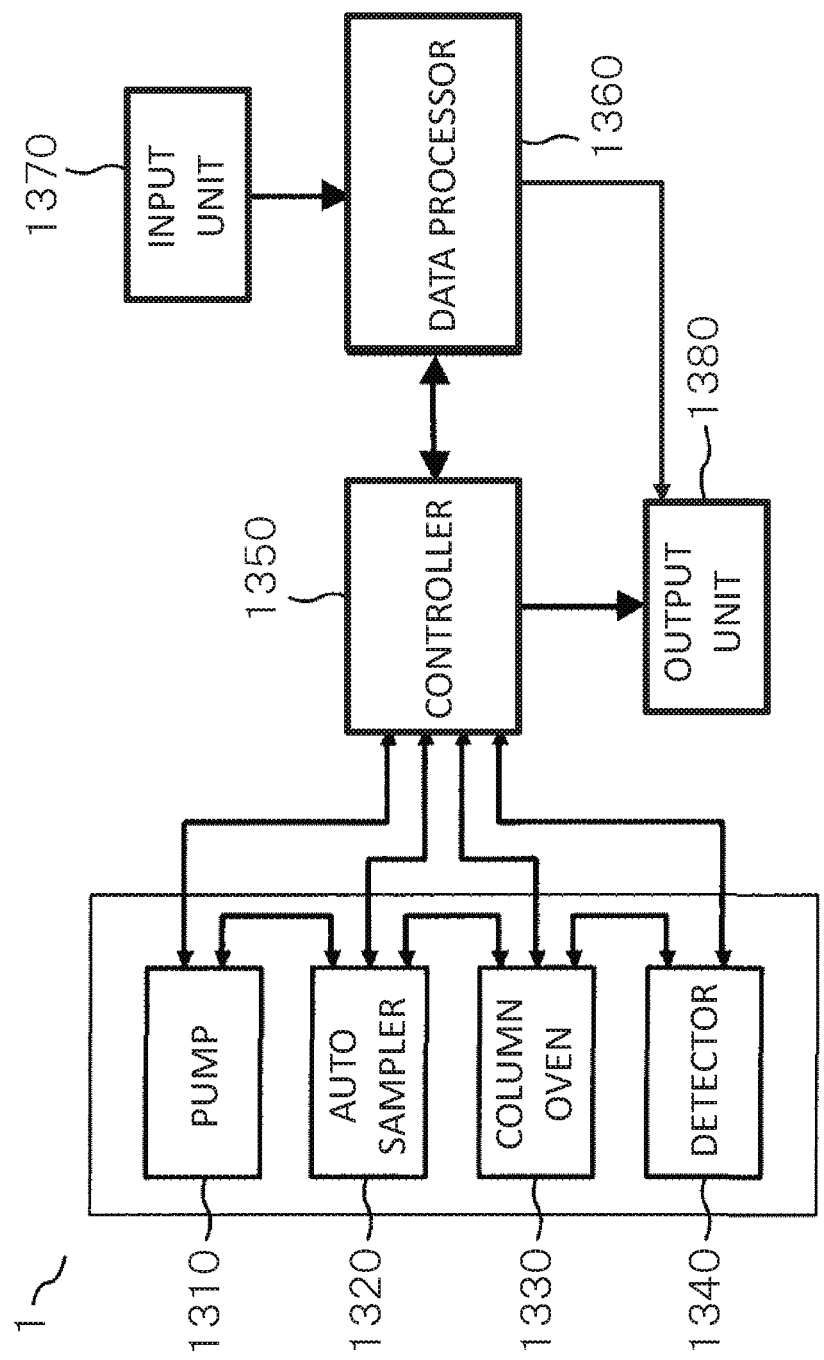
FIG. 13 is a diagram showing an example of a liquid chromatography apparatus including a liquid chromatographic data system processing apparatus of the present disclosure.

FIG. 13 shows a configuration diagram of a liquid chromatography system according to an embodiment of the present disclosure. A liquid chromatography apparatus 1 corresponds to the configuration described above with reference to FIG. 12, and includes the pump 1220, the autosampler 1240, the column oven 1250, and the detector 1270. Each module in the liquid chromatography apparatus 1 is connected to a controller 1350, and data is exchanged among the modules. The processed result in the controller 1350 is displayed on an output unit 1380. In addition, the controller 1350 exchanges data with a data processor 1360. The data processor 1360 can perform processing based on the conditions input from an input unit 1370. The controller 1350 and the data processor 1360 may perform processing on the same computer. In the data processor 1360, the liquid chromatographic separation condition analysis processing according to the present disclosure is executed.

As shown in FIG. 13, the data processor 1360 is connected with each portion of the liquid chromatography system. A signal from the detector 1270 shown in FIG. 12 and information such as a measurement condition input by an operator are input through the input unit 1370.

The data processor 1360 may not be connected with the controller 1350 to be independent from the liquid chromatography system. In a case where the data processor 1360 is independent, the data processor 1360 may perform processing based on the conditions input from an input unit 1370. The data processor 1360 corresponds to the chromatographic data system processing apparatus described in the claims.

Figure 7:
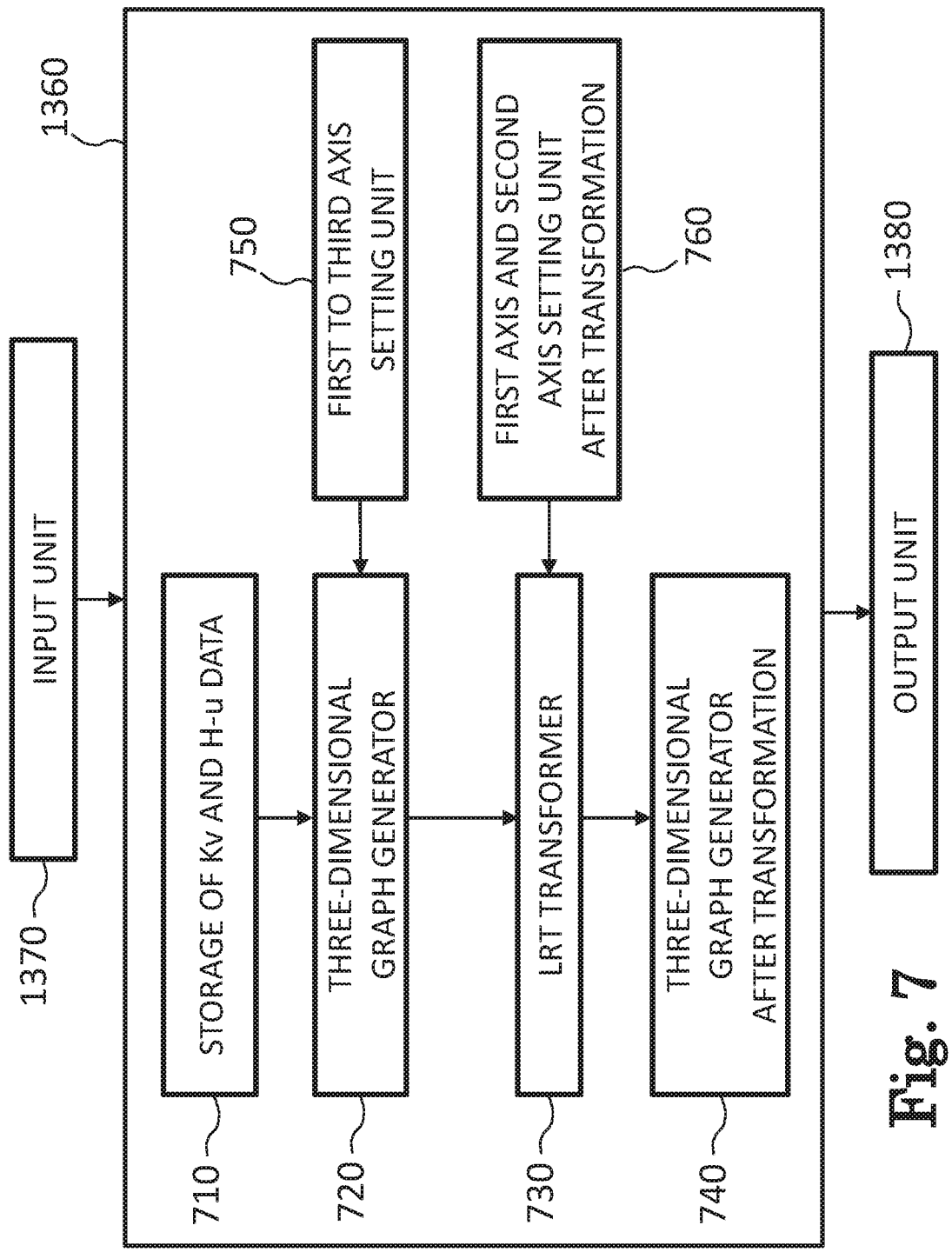
FIG. 7 is a diagram showing an example of a chromatographic data processing system apparatus (a case of an LRT mechanism diagram)

FIG. 7 shows an example of the chromatographic data processing apparatus (1360) shown in FIG. 13. Data relating to the column permeability and an H-u curve are input to a storage (710) of Kv and H-u data from the input unit (1370) in an EXCEL file or the like. The input unit (1370) can also input the regression coefficients A, B, and C of fitting curves of $K_V$ and Van Deemter equation from a keyboard or the like. The respective coordinate axes $u_0$, L, N are set from a first to third axis setting unit (750), and N ($u_0$, L) shown in FIG. 1, for example, is generated by a three-dimensional graph generator (720). The result is displayed on the output unit (1380) such as a display.

Alternatively, by designating the respective coordinate axes, $\Pi$, and $t_0$, for example, from a first axis and second axis setting unit (760) after transformation, an LRT transformer (730) executes the rotation of the logarithmic axis and the scaling transformation. The result is transferred via a three-dimensional graph generator (740) after transformation to generate a three-dimensional graph, and the three-dimensional graph of N ($\Pi$, $t_0$) shown in FIG. 4 is displayed on the output unit (1380) such a display. The result can also be printed as necessary.

Figure 8:
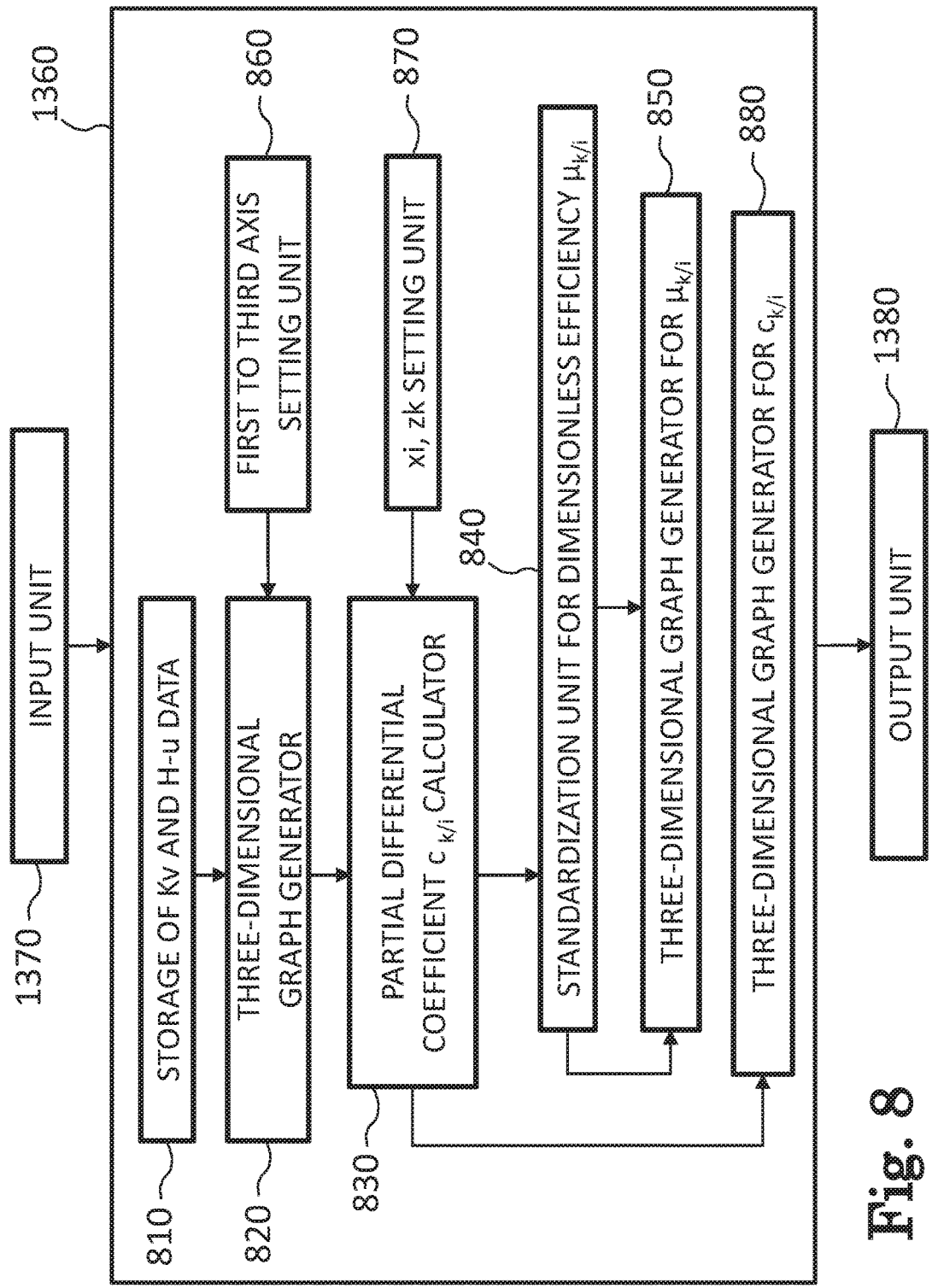
FIG. 8 is a diagram showing an example of a chromatographic data processing system apparatus (a case of a PAE mechanism diagram)

FIG. 8 shows another example of the chromatographic data processing apparatus (1360). Data relating to the column permeability and an H-u curve are input to a storage (810) of Kv and H-u data from the input unit (1370) in an EXCEL file or the like. The input unit (1370) can also input the regression coefficients A, B, and C of fitting curves of $K_V$ and Van Deemter equation from a keyboard or the like. For example, the respective coordinate axes $\Pi$, $t_0$, N are set from a first to third axis setting unit (860), and N ($\Pi$, $t_0$) shown in FIG. 4 is generated by a three-dimensional graph generator (820). The result is output from the output unit (1380) such as a display.

By specifying, for example, $\Pi$ and N respectively from the a xi, zk setting unit (870), a partial differential coefficient $c_{k/i}$ calculator (830) calculates the partial differential coefficient. First, the result can be displayed from the output unit (1380) in a three-dimensional graph of $c_{N/\Pi}$ ($\Pi$, $t_0$) as necessary. Next, the result is displayed as a three-dimensional graph of $\mu_{N/\Pi}$ ($\Pi$, $t_0$) shown in FIG. 5 by a standardization unit (840) for the dimensionless efficiency $\mu_{k/i}$. The result can also be printed as necessary. Similarly, by designating $t_0$, N from the xi, zk setting unit (870), a three-dimensional graph of $\mu_{t/\Pi}$ ($\Pi$, $t_0$) shown in FIG. 6 can be output.

The flow rate F (ml/min) is proportional to the linear velocity $u_0$ (mm/s). These correspond to a variable $x_1$, and the cross sectional area (m$^2$) of the inner diameter of the column is related to the porosity of the filled state. A variable $x_2$ having a length dimension (m) is the column length L (mm). A variable $x_3$ corresponding to the pressure is the column pressure drop $\Delta P$ (MPa), which is also proportional to $\Pi$ (m$^2$/s). $\Pi$ is called the velocity length product or the pressure-driven strength. A time variable $x_4$ is the hold-up time t $t_0$ (s) or the retention time $t_R$ (min). The number of theoretical plates N is a variable or function of $z_1$ and is inversely proportional to the theoretical plate equivalent height H (μm). The function $z_2$ is the reciprocal of the impedance time $t_E$, the function $z_3$ is the reciprocal of the separation impedance E, and the function $z_4$ is the reciprocal of the plate time $t_P$.

Figure 9:
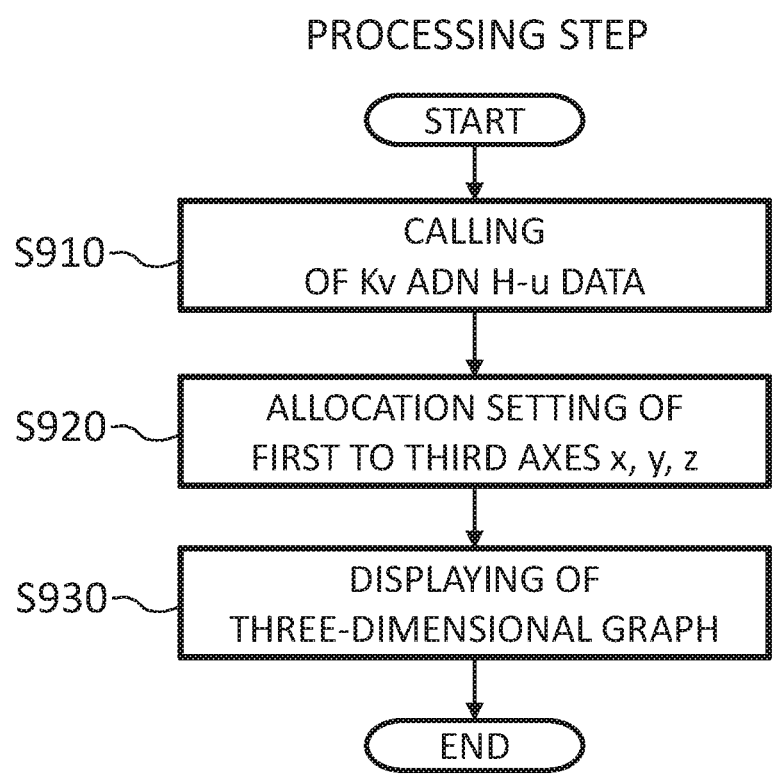
FIG. 9 is a diagram showing a flow of a three-dimensional graph generation process.

FIG. 9 shows a flowchart of an example of a chromatographic data processing step performed by the liquid chromatographic data system processing apparatus of the present disclosure. After starting the chromatographic data processing step, Kv and H-u data are called in a calling step of Kv and H-u data (S910) and $u_0$, L, N are set in an allocation setting step of the first to third axes x, y, z (S920), for example. The result is output as a graph shown in FIG. 1 and/or separation condition analysis in a three-dimensional graph displaying step (S930), and the chromatographic data processing step is ended.

Figure 10:
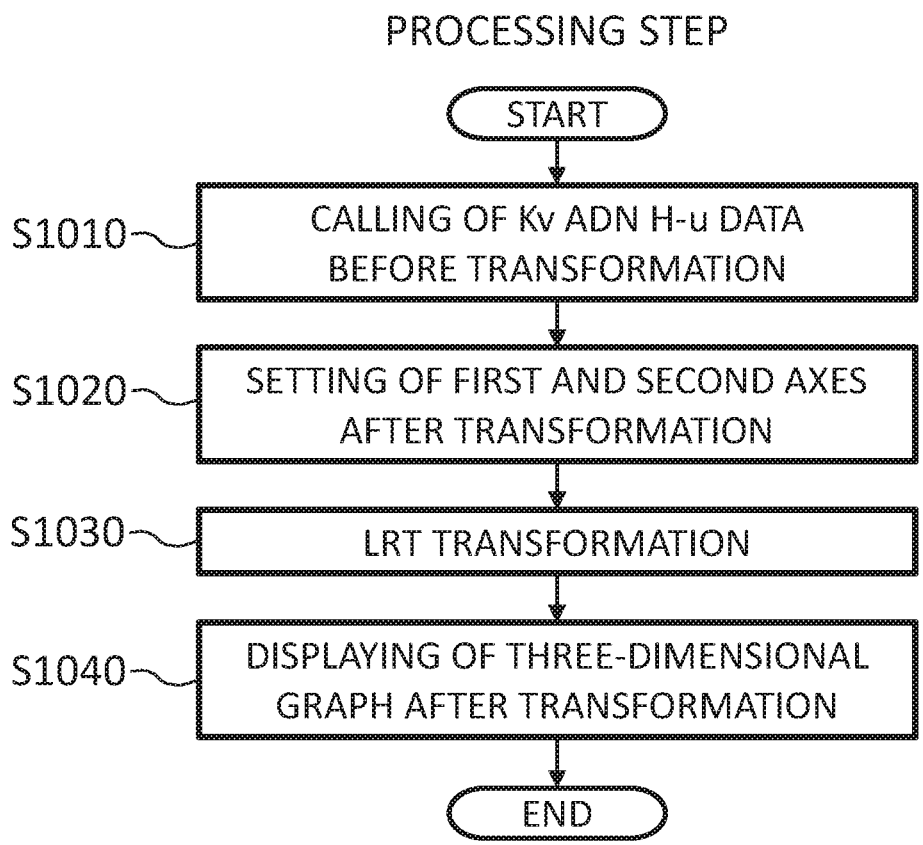
FIG. 10 is a diagram showing a flow of an LRT transformation process.

The flowchart of FIG. 10 shows another example of the chromatographic data processing step. After starting the chromatographic data processing step, an N ($u_0$, L) graph is read in a calling step of a three-dimensional graph before transformation (S1010). For example, $\Pi$ and $t_0$ are designated in a first axis and second axis setting step after the transformation (S1020). Based on the variable axis $\Pi$, $t_0$, LRT transformation is executed in an LRT transformation step (S1030). In a displaying step of the three-dimensional graph after transformation, N ($\Pi$, $t_0$) shown in FIG. 4 is output (S1040), and the chromatograph data processing step is ended.

Figure 11:
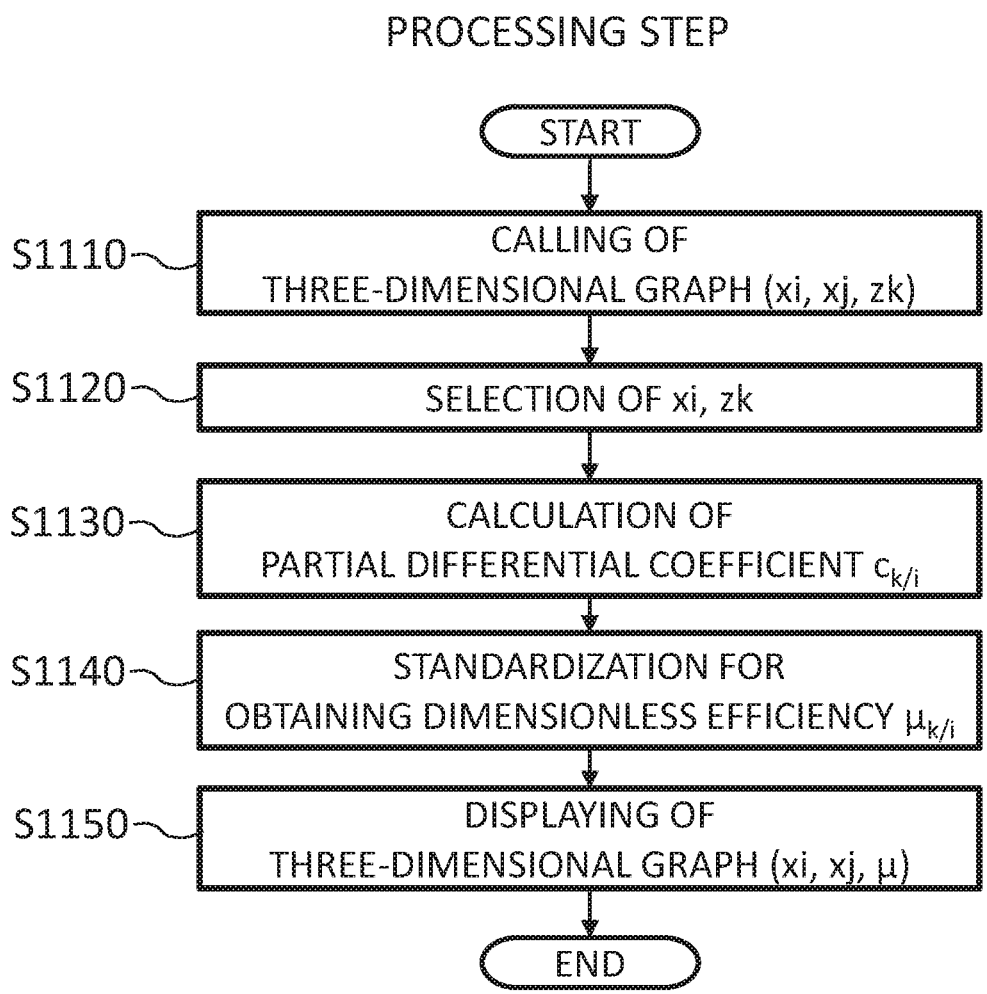
FIG. 11 is a diagram showing a PAE calculation process flow.

The flowchart of FIG. 11 shows an example of the PAE as still another example of the chromatographic data processing step. After starting the chromatography data processing step, for example, an N ($\Pi$, $t_0$) graph is read in a calling step of a three-dimensional graph (xi, xj, zk) (S1110). Here, (xi, xj, zk) correspond to ($\Pi$, $t_0$, N), respectively. In a selection step of xi and zk, for example, N and $\Pi$ are designated respectively (S1120). Calculation of the partial differential coefficient $c_{N/\Pi}$ is performed in a step of calculating the partial differential coefficient $c_{N/\Pi}$ based on the designation of the selection step of xi and zk (S1130). Next, $\mu_{N/\Pi}$ ($\Pi$, $t_0$) shown in FIG. 5 is calculated in a standardization step for obtaining the dimensionless efficiency $\mu_{k/i}$ (S1140), in a displaying step of the three-dimensional graph (xi, xj, μ), $\mu_{N/\Pi}$ ($\Pi$, $t_0$) is output as a three-dimensional graph and/or separation condition analysis (S1150), and the chromatographic data processing step is ended. Alternatively, $\mu_{t/\Pi}$ ($\Pi$, $t_0$) shown in FIG. 6 can also be displayed and printed by the same operation.

The three-dimensional graph can also be expressed with a logarithmic axis. For example, a three-dimensional graph expressed by a logarithmic coordinate (log $u_0$, log L) is expressed as (log $\Pi$, log $u_0$) by LRT transformation. Further, a PAE based on the slope on N (log $\Pi$, log $u_0$) can also be defined.

Alternatively, in obtaining a slope from the graph of function N (log $\Pi$, log $u_0$) or defining some sort of efficiency, the PAE can be calculated on N (log $\Pi$, log $u_0$) by LRT transformation.

In addition, these can also be generalized representation.

Next, an example of an analysis example of separation conditions using a three-dimensional graphic representation of the liquid chromatographic data system processing apparatus of the present disclosure will be described. As an example of the utilization shown in FIG. 4, a maximum pressure or a withstand pressure $\Delta P$ of the column and the HPLC system is determined first by viewing the three-dimensional graph. Next, the time $t_0$ is changed and the number of theoretical plates N at that time is obtained. A point decided tentatively is indicated in a circle. In the example of FIG. 4, the coordinate is (45, 8, 7000). It means that $\Delta P$ and $t_0$ are 5 MPa and 8 s respectively, and the expected N is 7,000 stages.

Figure 1:
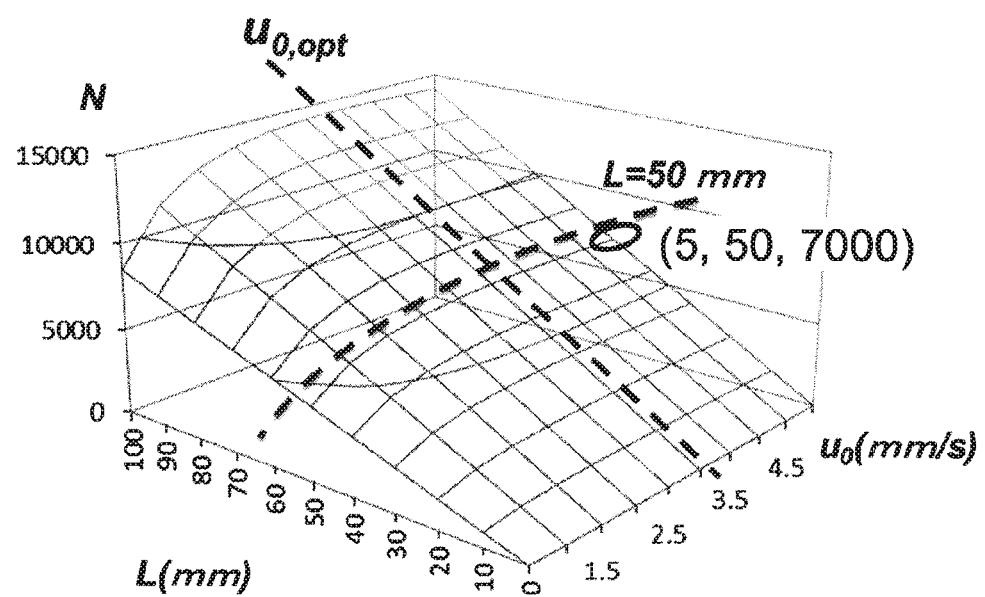
FIG. 1 is a diagram showing an output example of a liquid chromatographic separation condition analysis of the present disclosure in addition to the concept of a three-dimensional graph N ($u_0$, L) in the Literature 2 having a particle diameter of 2 μm.

Next, when transforming FIG. 4 into FIG. 1, the circle corresponding to the point is output and represented as (5, 50, 7000). That is, linear velocity $u_0$=5 mm/s and column length L=50 mm are easily obtained as separation conditions.

This designated circle is also transformed into FIG. 5 to obtain a three-dimensional coordinate (45, 8, 0.84). That is, the pressure-application coefficient $\mu_{N/\Pi}$ of the number of theoretical plates at that time is 0.84, which is close to a ratio of 1 obtained at the optimal linear velocity $u_{0,opt}$, and a relatively good value can be obtained for high separation. On the other hand, similarly, the circle is also transformed to the pressure-application coefficient $\mu_{t/\Pi}$ in the time of FIG. 6, but here, it is understood that the pressure-application coefficient is somewhat inferior to 0.72 and $\mu_{N/\Pi}$. That is, it can be understood that it is an effective pressure increasing condition for N, but for $t_0$, it is a separation condition that is relatively ineffective in speeding-up even if the pressure is increased by relatively effort.

$\mu_{N/\Pi}$ and $\mu_{t/\Pi}$ are called PAC (Pressure-Application Coefficient), and $\mu_{N/t}$ is called TEC (Time-Extension Coefficient). Equations 24 to 28 are the definition equations.

The application of PAC (Pressure-Application Coefficient) and TEC (time extension coefficient) is shown in detail in the case of six approaches.

Figure 14:
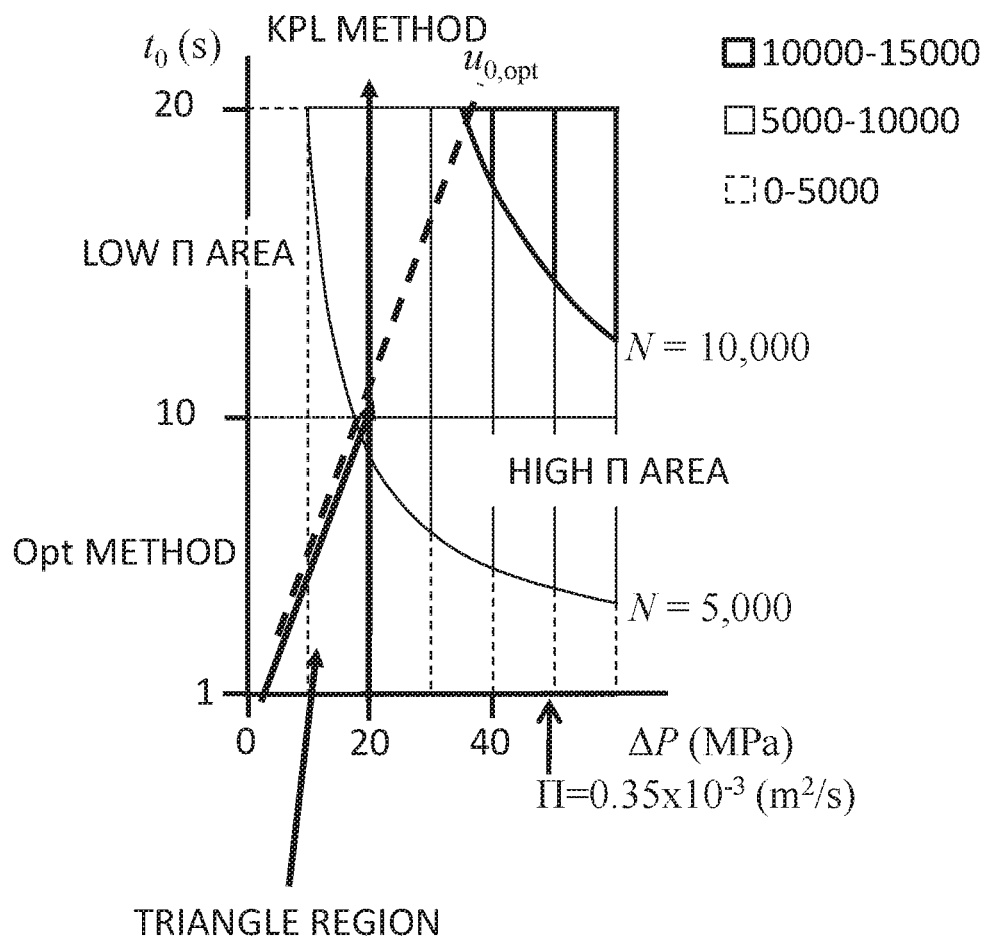
FIG. 14 is a plot showing contours.

FIG. 14 is a contour plot of N ($\Pi$, $t_0$) of a filler having a particle diameter of 2 μm, which includes a straight line indicating high-speed and high-separation performance obtained with an optimal linear velocity $u_{0,opt}$. As is also found in textbooks, in order to improve N generally, a method to climb the hill along the $u_{0,opt}$ line is recommended (Opt method). This is because the efficient $H_{min}$, which is a height corresponding to the minimum number of theoretical plates on the $u_{0,opt}$ line, is obtained.

The pressure upper limit approaches 20 MPa around N=5,000 or more and the $u_{0,opt}$ line cannot be climbed along. In order to further increase N from here, a KPL method is adopted which is a method of climbing a hill under a constant condition that the upper limit pressure is 20 MPa. However, it is understood that in the KPL method, the climbing method is comparatively gentle, and only about N=7,000 is obtained, so that the efficiency of increasing N is worse than the Opt method. PAC and TEC are introduced as coefficients quantitatively indicating this efficiency.

In addition, as shown in FIG. 14, there are two areas with the $u_{0,opt}$ line as a boundary. One area is a high $\Pi$ area whose $\Pi$, i.e., pressure, is higher the $u_{0,opt}$ line, and the other area is a low $\Pi$ area on contrary.

Figure 15:
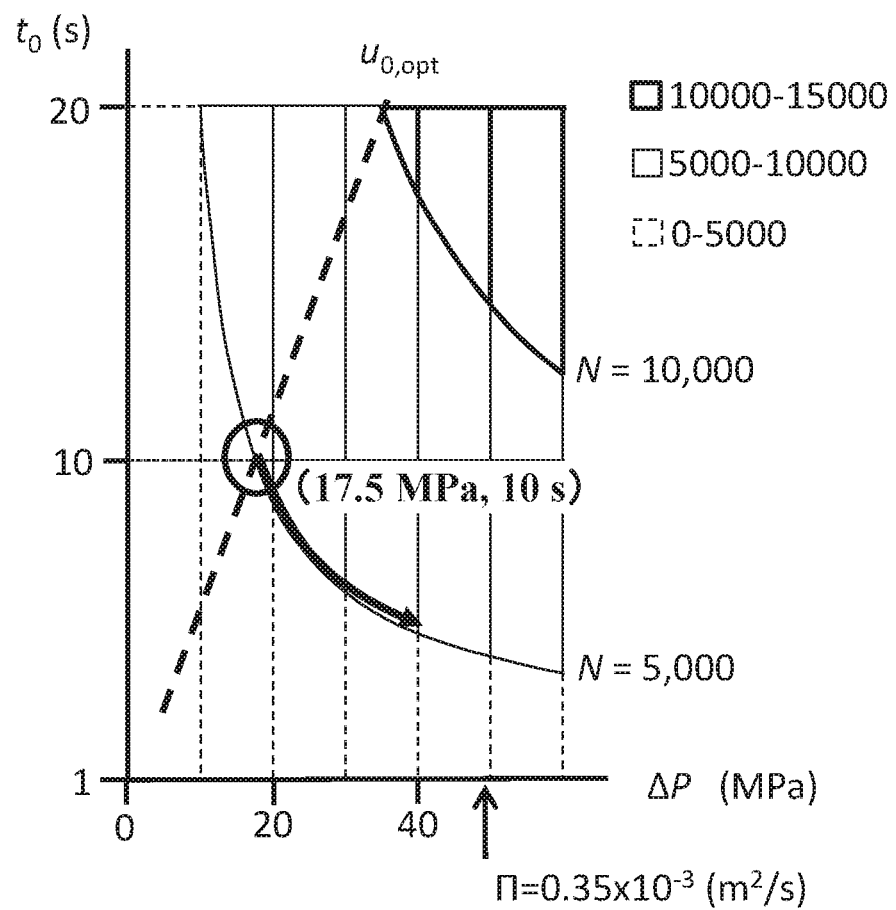
FIG. 15 is a diagram showing extension to a (1) high $\Pi$ area in speeding-up of to under a constant condition of N.

In the Opt method, the $u_{0,opt}$ line or the vicinity thereof is selected as an optimal separation condition, but the minimum $H_{min}$ is obtained the $u_{0,opt}$ line. Therefore, if an arbitrary L column is attached, the maximum N at this L is inevitably obtained. At the same time, $t_0$ and Π are unambiguously calculated. That is, in a five-dimensional space (Π, $t_0$, N, $u_{0,opt}$, L), a so-called straight line $u_{0,opt}$ line determined by a constant $u_{0,opt}$ is shown. For example, if a user requests N=5,000, he or she can see contour lines on a height surface of N=5,000, i.e., on hilly slopes (FIG. 15). On the basal plane (17.5 MPa, 10 s), an intersection point of the $u_{0,opt}$ line and the contour line of N=5,000 is seen. Here, a pressure of 17.5 MPa is proportional to Π, and corresponds to Π=0.12×10$^{-3}$ m$^2$/s. Accordingly, it is shown that, since the way to see the contour plot of N (Π, $t_0$), the introduction of the pressure-application coefficient PAC and the time extension coefficient TEC is effective to quantitatively optimize the separation condition next.

Hereinafter, six approaches are shown.
1. Speeding-up of $t_0$ under constant condition of N
   (1) Extension to the high Π area
   (2) Low Π area (movement to upper limit pressure $Π_{max}$)
2. High separation of N under constant condition of $t_0$
   (1) Extension to the high Π area
   (2) Low Π area (movement to upper limit pressure $Π_{max}$)
3. Expansion under $Π_m$ upper limit pressure
   (1) Speeding-up (reduction in $t_0$)
   (2) High separation (increase in N)

Approach 1-(1) is an optimization method that aims to realize high speeding-up while ensuring a constant N (FIG. 15). The driving force for the speeding-up of to is pressure, which belongs to the high Π area. First, the method starts from the intersection point of the contour line of N=5,000 and the $u_{0,opt}$ line (Opt method). As described above, $t_0$=10 s is obtained at the intersection point, and ΔP=17.5 MPa. That is, the pressure increases in the direction of 40 MPa along the contour line. Based on the coefficient value (efficiency) indicated by PAC $μ_{t/Π}$, it is possible to determine to how much pressure to increase is effective. On the $u_{0,opt}$ line, $μ_{t/Π}$=1.

As shown in FIG. 16, at the time of 40 MPa, although $μ_{t/Π}$ is not good, 0.65 is acceptable. At the time of 60 MPa, when $μ_{t/Π}$ is 0.54, efficiency gets worse. Therefore, in the approach 1-(1), while seeing at $μ_{t/Π}$, the pressure increase will normally be stopped around 40 MPa. Depending on the separation application, even if the pressure is not effective for speeding-up when $μ_{t/Π}$ is 0.54, if there is an advantage that the hold-up time $t_0$ can be reduced by about 20% from 5 s to 4 s of 40 MPa, there is also a scene of increasing the pressure to 60 MPa plus 50% with an additional pressure. The fact that $μ_{t/Π}$ is only 0.54 corresponds to the efficiency at a pressure of 60 MPa, which is effective only for reducing the time by 0.54% even if the pressure is increased by 1%.

Figure 17:
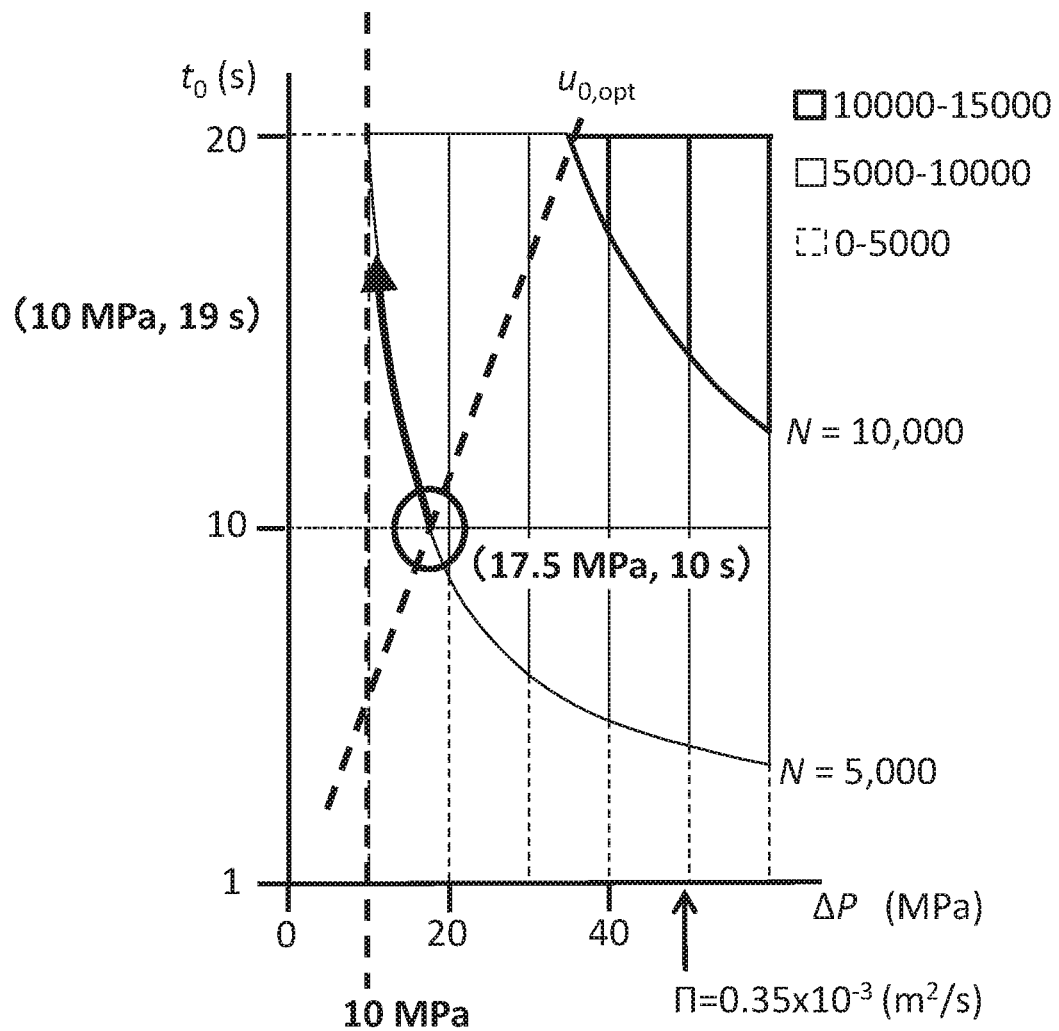
FIG. 17 is a diagram showing a movement to a (2) low $\Pi$ area in speeding-up of $t_0$ under a constant condition of N.

Approach 1-(2) corresponds to a case where an arbitrary N is expected to be obtained, and the intersection point of the $u_{0,opt}$ line and the contour line of N is already above the upper limit pressure. The approach 1-(2) is a method of lowering the pressure, that is, making the pressure belongs to the low Π area and securing N along the contour line while extending the time, so as to obtain this N (FIG. 17).

First, the method starts from the intersection point of the contour line of N=5,000 and the $u_{0,opt}$ line (Opt method). In a case where the upper limit pressure is 10 MPa, it is inevitable to lower the pressure to 10 MPa along the contour line of N=5,000. The fact that $μ_{t/Π}$ is 1.39 means that at the intersection point of 10 MPa and the contour line, it is possible to speed up 1.39 times from the vicinity of the $u_{0,opt}$ line, by just increasing the pressure slightly, that is, increasing the Π increment. Conversely, the low Π area is an area where the high speed performance is inevitably extremely sacrificed when trying to obtain the high separation performance which is disproportionate. (FIG. 18)

Figure 19:
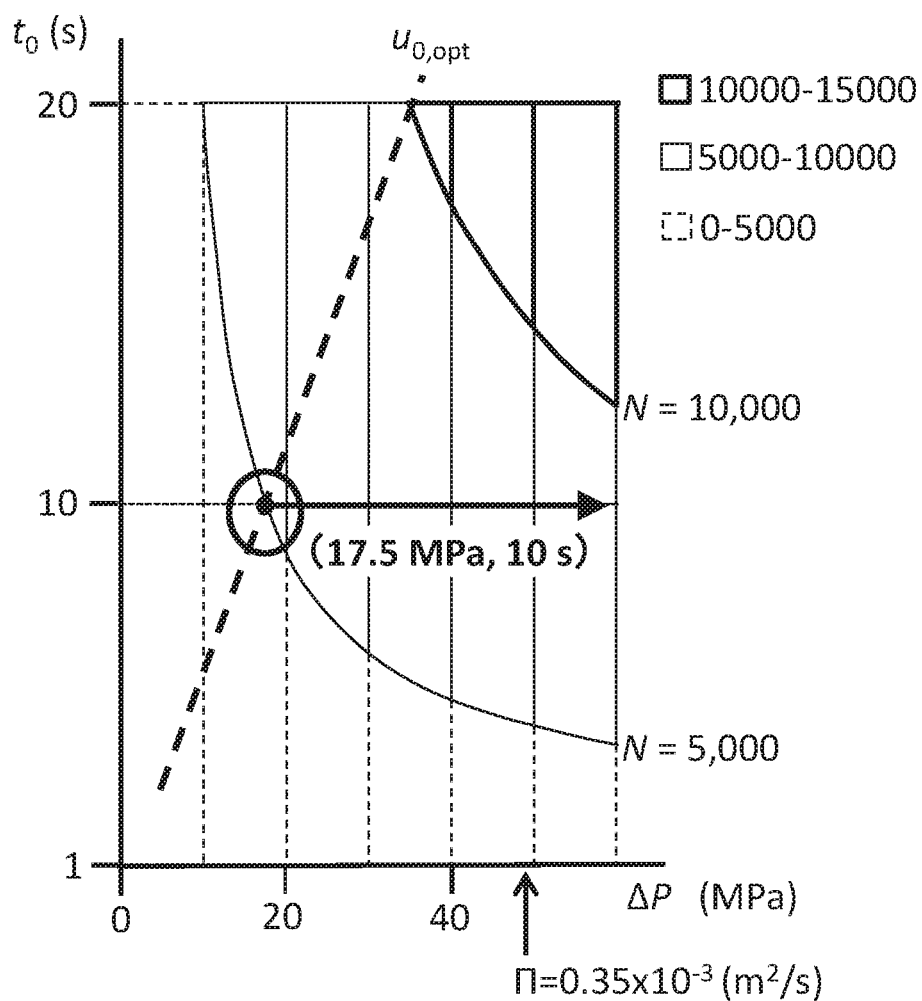
FIG. 19 is a diagram showing extension to a (1) high $\Pi$ area in high separation of N under a constant condition of $t_0$.

Approach 2-(1) is an optimization method that aims to realize high separation while ensuring a constant $t_0$ (FIG. 19). The driving force for the high separation of N is also pressure, which belongs to the high Π area. First, the method starts from an intersection point of the horizontal line of a constant $t_0$=10 s and the $u_{0,opt}$ line (Opt methorid). At the intersection point, N=5,000 is obtained, and ΔP=17.5 MPa. In order to further increase N from here, the pressure is increased to the right for such as 40 MPa or 60 MPa. The KPL method simply increases the pressure to the upper limit, but in the approach 2-(1), the pressure can be determined by seeing the efficiency by PAC. An index indicating whether N corresponding to the pressure increase can be obtained by increasing the pressure is $μ_{N/Π}$. Since $μ_{N/Π}$ equals to 0.80 at 40 MPa and 0.71 at 60 MPa, N can be obtained with an acceptable efficiency even at 60 MPa. Therefore, the approach 2-(1) is considered to be an effective approach method capable of achieving high separation without following the $u_{0,opt}$ line with $μ_{N/Π}$=1. (FIG. 20)

Figure 21:
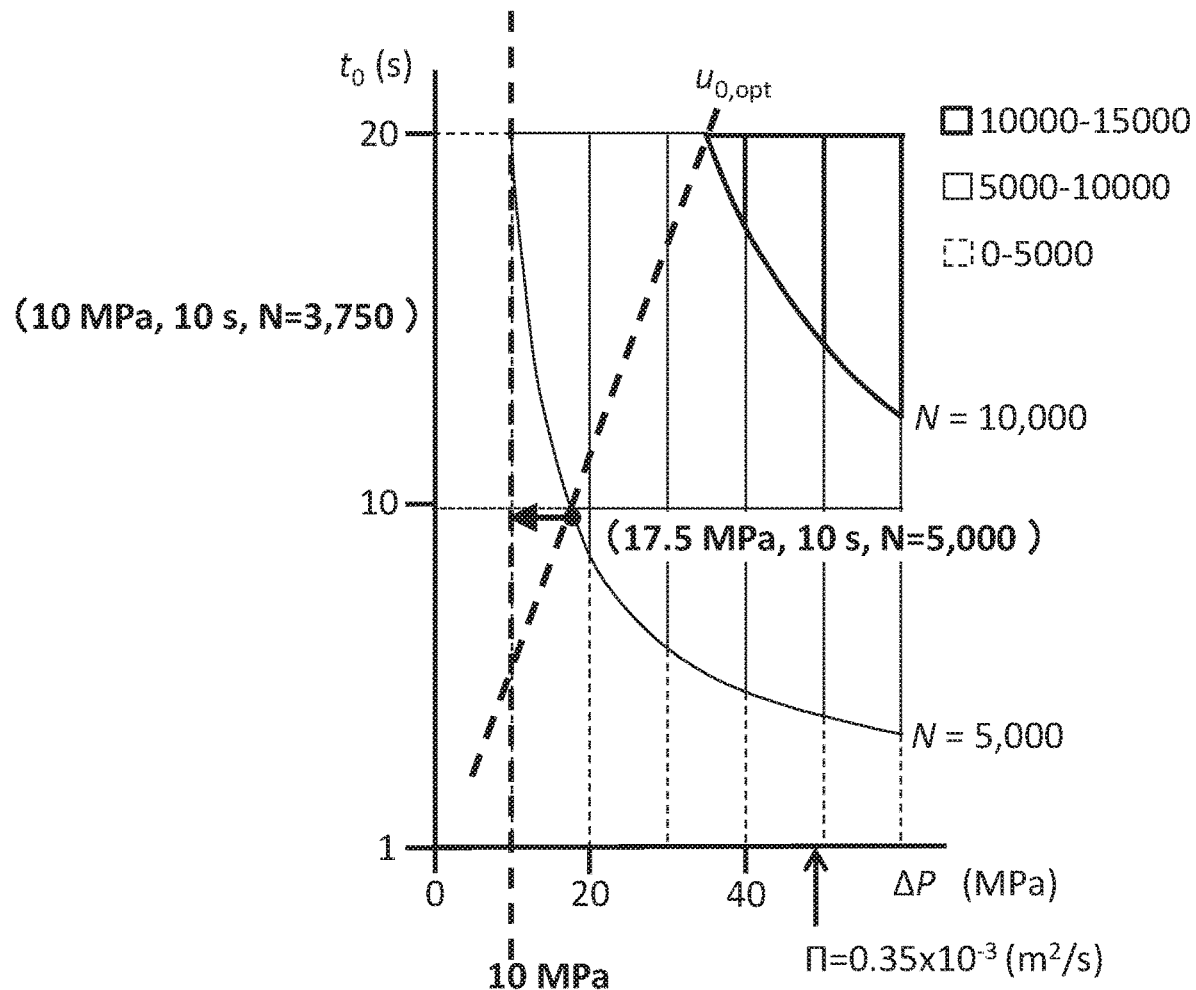
FIG. 21 is a diagram showing a movement to a (2) low $\Pi$ area in high separation of N under a constant condition of $t_0$.

Approach 2-(2) corresponds to a case where an arbitrary $t_0$ is expected to be obtained, and the intersection point of the $u_{0,opt}$ line and the horizontal line of a constant $t_0$ is already above the upper limit pressure. The approach 2-(2) is a method of lowering the pressure, that is, making the pressure belongs to the low Π area and reaching the upper limit pressure along the $t_0$ horizontal line while dropping N, so as to obtain this $t_0$ (FIG. 21).

First, the method starts from an intersection point of the horizontal line projected on a basal plane with a constant $t_0$=10 s and the $u_{0,opt}$ line (Opt method). In a case where the upper limit pressure is 10 MPa, it is inevitable to lower the pressure along the horizontal line of a constant $t_0$=10 s, and the separation condition is moved to the left direction from the $u_{0,opt}$ line to 10 MPa.

It is means that at the time of 10 MPa, $μ_{N/Π}$ is 1.16, and at the intersection point of 10 MPa and the horizontal line of $t_0$=10 s, it is possible to perform high separation 1.16 times from the vicinity of the $u_{0,opt}$ line, by just increasing the pressure slightly, that is, increasing the Π increment. Conversely, in order to obtain the high speed performance of $t_0$=10 s, the pressure is lowered, the pressure reduction rate is increased, and N gets worse. Therefore, the separation performance comes to be remarkably sacrificed. Since the approach 2-(2) uses the low Π area of barren area as in the approach 1-(2), it is inevitable to sacrifice the separation performance to a large extent when trying to obtain the extremely high speed performance (FIG. 22)

Figure 23:
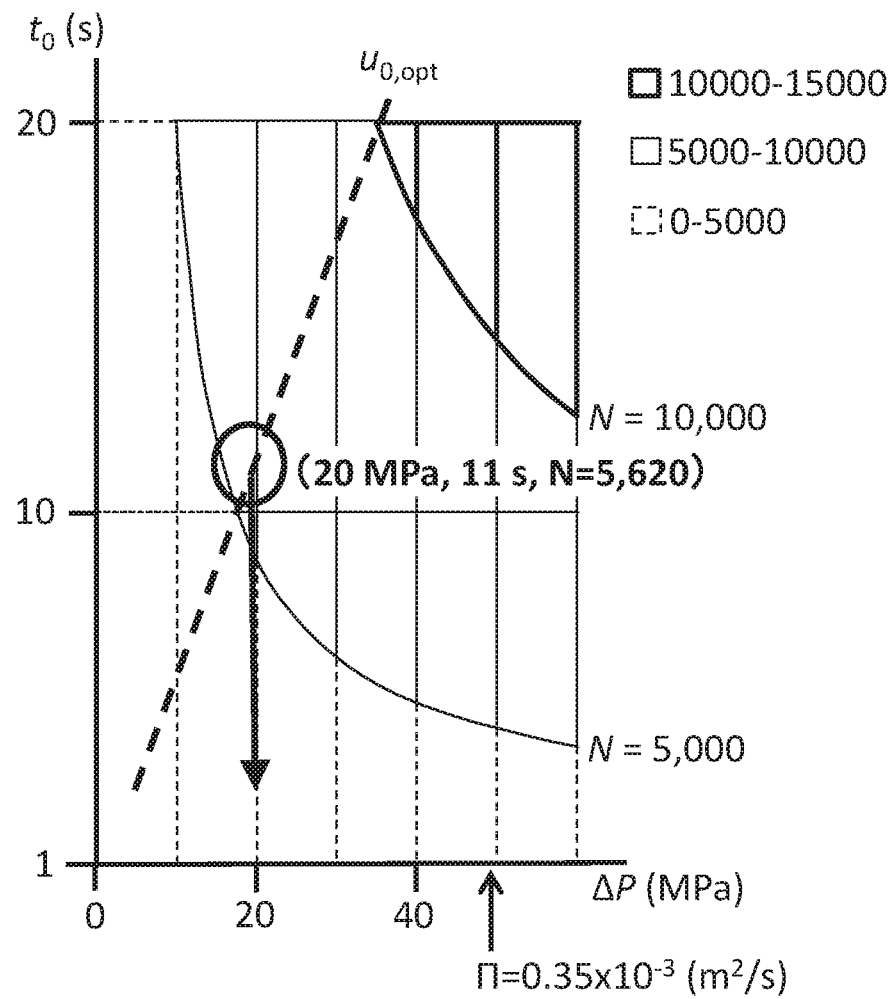
FIG. 23 is a diagram showing (1) speeding-up in deployment under a $\Pi_{max}$ upper limit pressure.

Approach 3 is a so-called KPL method that ensures a constant pressure. First, the approach 3-(1) is a speeding-up method (FIG. 23). Here, the separation performance is sacrificed and the high speed performance is obtained. The so-called high Π area means an area where $t_0$ is relatively short as seen from the $u_{0,opt}$ line as a reference, if turned inside out. Therefore, high speed performance is achieved.

First, the method starts from an intersection point of a vertical line of ΔP=20 MPa and the $u_{0,opt}$ line (Opt method). At the intersection point, $t_0$=11 s is obtained, and N=5,620 (FIG. 23). The separation condition is moved vertically downward from a start point on the $u_{0,opt}$ line, and although N decreases, the speeding-up of decreasing $t_0$ can be realized. The responsiveness (latent ability) to time change can be grasped by the time extension coefficient TEC $μ_{N/t}$. Since other coefficients are standardized on the $u_{0,opt}$ line similarly, 11 s is near the $u_{0,opt}$ line, so that $\mu_{N/t}=1.01$ (FIG. 24).

In a case where $t_0$ is speeded up to 3 s, N=2,760, which is remarkably reduced, but $\mu_{N/t}$ remains at 1.18; if the sacrifice of N is acceptable, it can be said that the approach 3-(1) is a reasonable speeding-up method in which the coefficient value gets worse.

Figure 25:
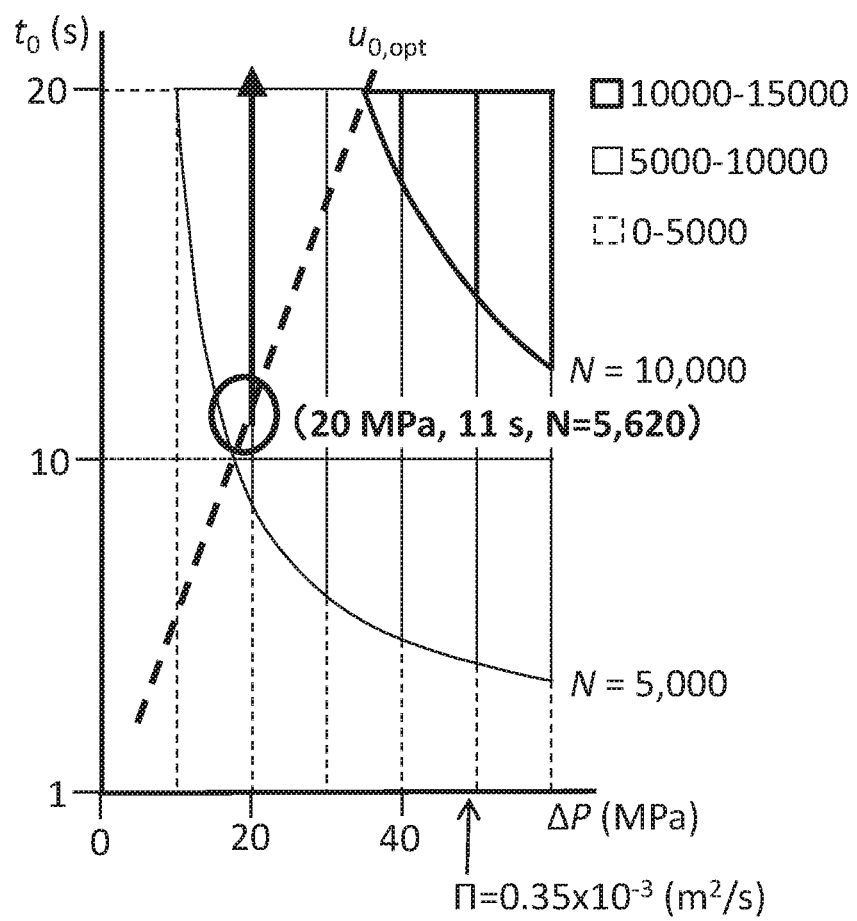
FIG. 25 is a diagram showing (1) high separation in deployment under a $\Pi_{max}$ upper limit pressure.

On the other hand, the approach 3-(2) is a high separation method (FIG. 25). The driving force at this time is time consumption. The low Π area means an area where $t_0$ is relatively long with the $u_{0,opt}$ line as a reference.

The method starts from an intersection point of a vertical line of ΔP=20 MPa and the $u_{0,opt}$ line (Opt method). At the intersection point, $t_0$=11 s is obtained, and N=5,620. In order to further increase N from here, the time is increased from the $u_{0,opt}$ line vertically upwards for 15 s or 20 s. Also in a case of 20 s, $\mu_{N/t}$=0.92, it is considered that N can be increased by using time relatively efficiently, which is an example of an effective KPL method. (FIG. 26)

In fact, as for the low Π area and the high Π area, the former is an area of $u_0$ lower than $u_{0,opt}$, and the latter is an area of $u_0$ higher than $u_{0,opt}$. On the contour plot, only the $u_{0,opt}$ line is expressed. Since $u_0$ is not expressed positively, the low Π area is expressed for convenience. As described above, although the speeding-up is excellent in the area of high $u_0$, the PAC such as $\mu_{N/\Pi}$ and $\mu_{t/\Pi}$ becomes 1 or less. On contrast, the PAC exceeds 1 in the low Π area. For example, in the low Π area, when the pressure is increased just little, this ratio increases and N increases greatly. Conversely, it means that even if N is lowered, there is no effect of lowering the pressure to such an extent.

First, a to constant transformation efficiency $\eta_t$ is defined.

For preparation, the numerator and denominator of Equation 20 are turned over to obtain Equation 40.

$$\left(\frac{\partial \Pi}{\partial N}\right)_{t_0} = 2\mu_{\Pi/N}\frac{\Pi}{N} \quad \text{(Equation 40)}$$

Therefore, $\mu_{\Pi/N}$ indicates a relationship between PAC $\mu_{N/\Pi}$ related to N and a reciprocal, as shown in equation 41.

$$\mu_{\Pi/N}=(\mu_{N/\Pi})^{-1} \quad \text{(Equation 41)}$$

The t constant transformation efficiency $\eta_t$ should have a value from 0 to 1 in order to position the efficiency. Therefore, the high Π area corresponds to $\mu_{N/\Pi}$, and the low Π area corresponds to $\mu_{\Pi/N}$. It is requested that the maximum efficiency value 1 on the $u_{0,opt}$ line. In this way, the t constant transformation efficiency $\eta_t$ can be expressed by one equation using PAC $\mu_{N/\Pi}$ related to N (Equation 42).

$$\log \eta_t = -|\log \mu_{N/\Pi}| \quad \text{(Equation 42)}$$

The above is the $t_0$ constant transformation efficiency $\eta_t$. Similarly, an N constant transformation efficiency $\eta_N$ can also be defined using PAC $\mu_{t/\Pi}$ related to $t_0$ (Equation 43).

$$\log \eta_N = -|\log \mu_{t/\Pi}| \quad \text{(Equation 43)}$$

In addition, a Π constant transformation efficiency $\eta_\Pi$ can also be defined using TEC $\mu_{N/t}$ (Equation 44).

$$\log \eta_\Pi = -|\log \mu_{N/t}| \quad \text{(Equation 44)}$$

Here, the meanings of the x constant transformation efficiencies $\eta_N$, $\eta_t$ and $\eta_\Pi$ are looked back. The contour plot is a graph expressing three variables Π, $t_0$, and N. Each constant transformation efficiency keeps one of the three variables constant and corresponds to the partial differential coefficient of the remaining two variables. In the high Π area, a short $t_0$ as high speed performance or high separation performance N can be obtained under specific transformation efficiency by applying a pressure.

FIG. 15 aims to perform speeding-up in the high Π area while keeping N constant. That is, it is optimal to transform N to the high speed performance, i.e., the short $t_0$, while consuming Π, i.e., pressure ΔP in the high Π area. The N constant conversion efficiency at this time is called $\eta_N$. If the index $\eta_N$ is used, and if ΔP is increased, it is possible to quantitatively grasp how the efficiency $\eta_N$ gradually decreases although the speed increases (FIG. 16).

In contrast, in FIG. 17, although N is constant, there is an advantage of lowering Π, i.e., ΔP by consuming time in the low Π area. In general, this approach is rare because the upper limit pressure is predetermined. Even in this case, if $\eta_N$ is used, the efficiency of lowing Π can be measured by consuming time under a constant N. As show in FIG. 18, even if $t_0$ is extended to 19 s, ΔP is only lowered to 10 MPa, and the efficiency $\eta_N$ is 0.72, which is not good.

Similarly in FIG. 19 where $t_0$ is constant, while considering the efficiency $\eta_t$ as a quantitative index, Π is consumed to earn N in the high Π area. In contrast, FIG. 21 shows a low Π area and it is possible to lower Π by consuming N. However, as described above, this approach is generally not adopted so much because the upper limit pressure is predetermined.

FIGS. 23 and 25 with constant Π are examples in which $\eta_\Pi$ can be effectively used. FIG. 23 is an optimization approach which can grasp the efficiency $\eta_\Pi$ for transforming Π to time $t_0$ by consuming N. In contrast, FIG. 25 is advantageous in that the efficiency $\eta_\Pi$ can be grasped with the approach of transforming Π to N by consuming $t_0$ under the constant Π.

However, efficiency $\eta$ system is ideal for searching for maximum value 1. To analyze the vicinity of boundary line such as the $u_{0,opt}$ line, the efficiency $\eta$ becomes an index not monotonically increase or decrease, which is also inconvenient. Hereinafter, it returns to practical PAC and TEC.

With reference to FIGS. 27 to 31, the concept of the present disclosure will be described based on the application of PAC and TEC.

Figure 27:
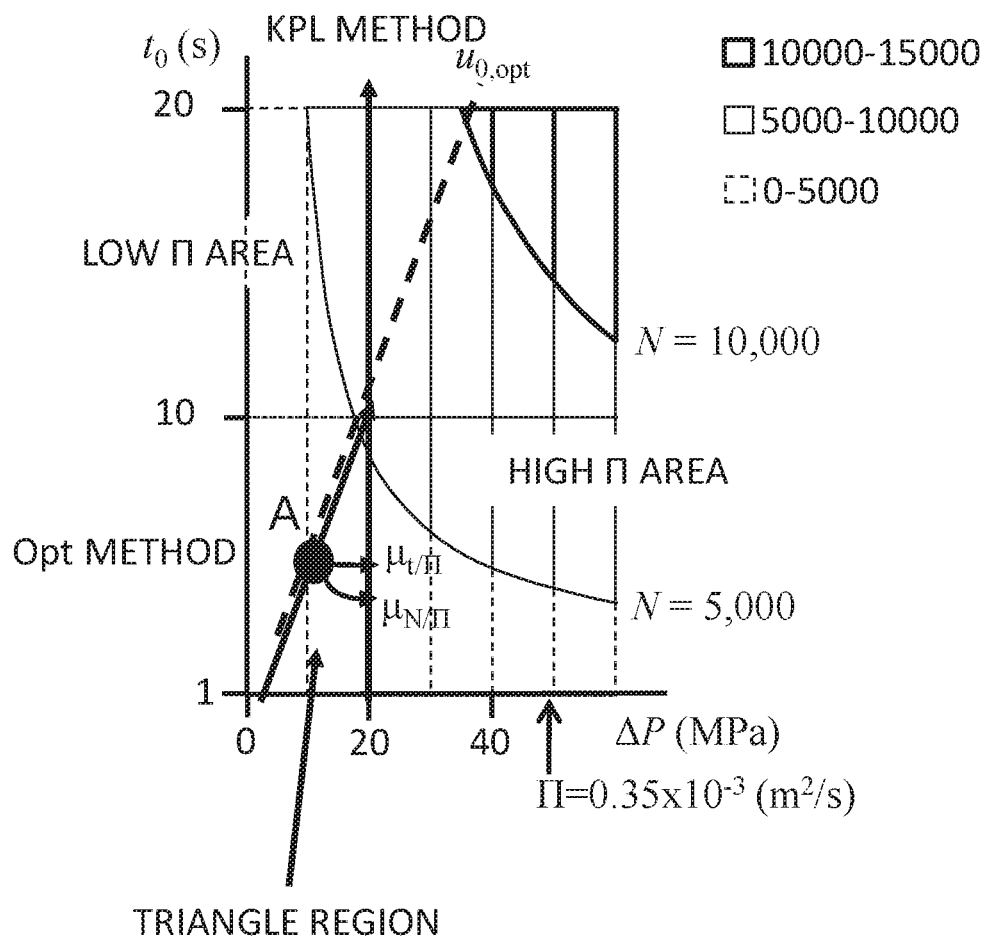
FIG. 27 is a diagram showing contours with PAC coefficients starting from N.

In FIG. 27, an upper limit of the pressure is 20 MPa. When an arbitrary N is to be obtained, first, a point A can be found on the $u_{0,opt}$ line, which may be adopted as a separation condition. Here, since the pressure is about 10 MPa, there are two ways for improving the performance by increasing the pressure. One is to achieve speeding-up by keeping N constant. Another is to further increase N starting from the point A at the same time $t_0$ to achieve high separation. $\mu_{t/\Pi}$ related to the time t can be used for the PAC in the former case, and $\mu_{N/\Pi}$ related to N can be used for the PAC in the latter case. It is not necessary to increase the pressure up to the upper limit line of KPL, and it is possible to quantitatively achieve speeding-up or high separation while using each PAC as an index. This is the aim of the present disclosure. The triangular region surrounded by the $u_{0,opt}$ line and the upper limit line of KPL and the vicinity thereof are areas where speeding-up or high separation is effective by using the pressure as a driving force. PAC $\mu_{t/\Pi}$ or $\mu_{N/\Pi}$ presents at an arbitrary point within the triangular region, and the effectiveness can be quantitatively grasped. In a case where the desired N is beyond this triangular region, that is, in a case where N is desired to be higher than an intersection point of the $u_{0,opt}$ line and the upper limit line of KPL, N must be increased along the KPL straight line. Quantitative optimization on the KPL straight line will be described later.

Figure 28:
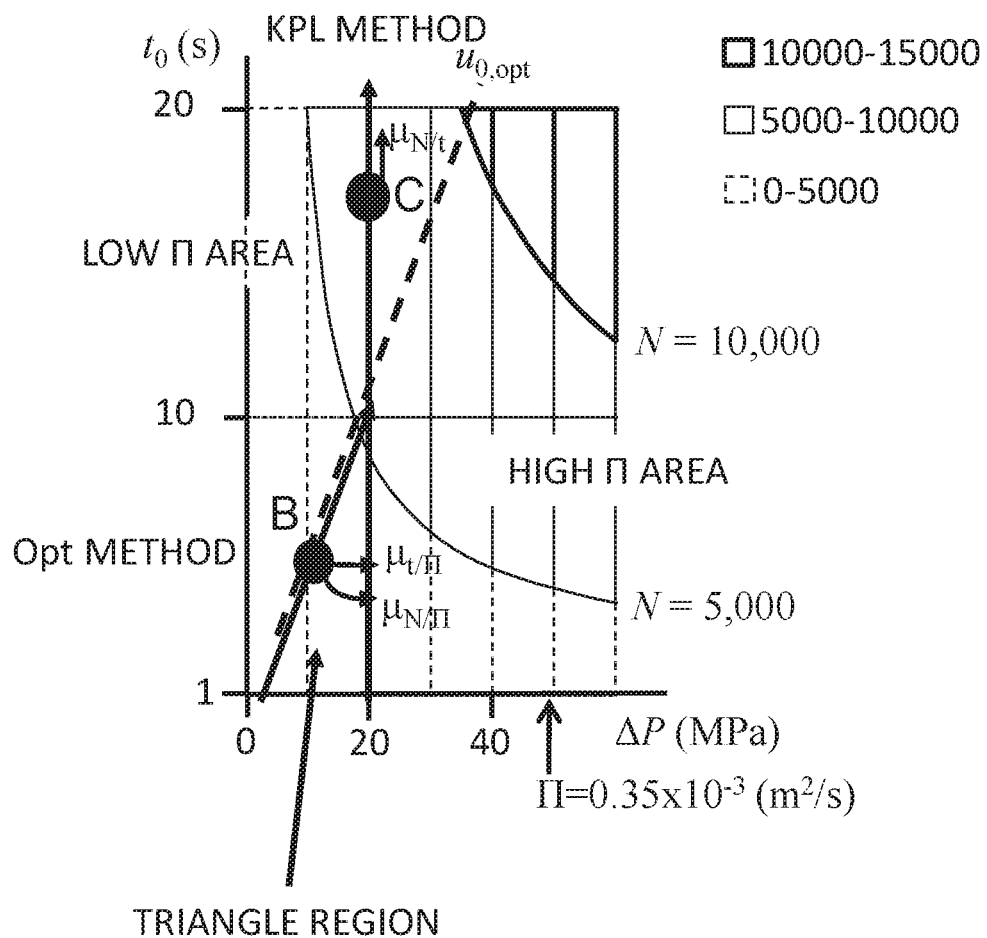
FIG. 28 is a diagram showing contours starting from the time $t_0$.

Next, when an arbitrary $t_0$ is to be obtained, first, a point B is found on the $u_{0,opt}$ line in FIG. 28. For example, if the point B is the same point as the point A in FIG. 27, the rest of the discussion is exactly the same. Here, since the pressure is about 10 MPa, there are two ways for improving the performance by increasing the pressure. One is to achieve high separation by keeping $t_0$ constant. Another is to further shorten $t_0$ starting from the point B at the same contour N to achieve speeding-up. Since each PAC can be calculated at an arbitrary point within the triangular region, the effectiveness of the pressure increase can be quantitatively understood. In a case where the specified $t_0$ is beyond the triangular region, calculation is performed with N being the maximum N on the KPL straight line, and if N is sufficient, the speeding-up can be discussed.

Quantitative optimization on the above KPL straight line, that is, the upper limit pressure will be described in detail.

If an arbitrary N is specified and a point C having a longer time than the vertex (intersection) of the previous triangular region is found, the separation condition is adopted. Here, if N is to be increased, $t_0$ is further extended, so that the effectiveness of time extension can be measured with reference to TEC $\mu_{N/t}$. Even when seeing a state of TEC $\mu_{N/t}$ by adding or subtracting $t_0$, if the interval is longer than the intersection point, the effectiveness can be grasped as TEC of 1 or less.

In a case where an arbitrary $t_0$ is specified and a point C having a longer time than the vertex (intersection) of the above triangular region is found, it is possible to further perform the speeding-up if it is determined that N is sufficiently large. It is possible to define the time reduction coefficient in the case of moving on the KPL straight line or define the N consumption coefficient as the reciprocal of $\mu_{N/t}$, i.e., $\mu_{t/N}$. In a case where N is sufficiently large, first, the contour plot is referred to again with the specified N.

If it is a coefficient of the same point such as point A, the following relationship (Equation 45) holds from the definition.

$$\mu_{N/\Pi} = \mu_{N/t} \mu_{t/\Pi} \quad \text{(Equation 45)}$$

As can be seen, since TEC $\mu_{N/t}$ is greater than 1 at a point slightly coming into the high $\Pi$ area from the point A for example, $\mu_{N/\Pi}$ is larger than $\mu_{t/\Pi}$, and PAC is 1 or less in this high $\Pi$ area. Therefore, it is more effective and easier in high separation under a constant t than the speeding-up under a constant N. On the $u_{0,opt}$ line including the intersection above the triangular region, $\mu_{N/\Pi} = \mu_{N/t} = \mu_{t/\Pi} = 1$.

As described above, in a case where the point A (or the point B) is found on the $u_{0,opt}$ line by specifying N or $t_0$, it is significant to search the separation condition for the triangular region up to the upper limit pressure. In this case, the pressure effectiveness in the triangular region can be quantitatively understood using each PAC.

In a case where the separation condition is searched on the KPL straight line of a constant pressure above the triangular region as the point C, the separation condition is adopted. If there is room to add or subtract N or $t_0$, it is possible to quantitatively examine the effectiveness of the action $t_0$ given to N using TEC.

In order to make it easier to understand mathematical representations and graphs, the square theoretical plate number $\Lambda$ and an inverse hold-up time $v_0$ are introduced.

$$\Lambda = N^2$$

$$v_0 = t_0^{-1}$$

$$\Pi = H^2 \Lambda v_0 = L^2 v_0 = u_0 L$$

As can be seen from the equations, by expressing with $v_0$, the power of $\Pi$ is divided by the product of $\Lambda$ and $v_0$. Since $H^2$ is not a constant, but a ridge line is generated on the curved surface. By using the square theoretical plate number $\Lambda$ instead of N on the vertical axis of the three-dimensional graph, the KPL curved surface can be expressed almost like a plane. In contrast, with respect to high speed performance, the larger the numerical value of the reverse hold-up time $v_0$, the larger the high speed performance can be obtained.

Figure 29:
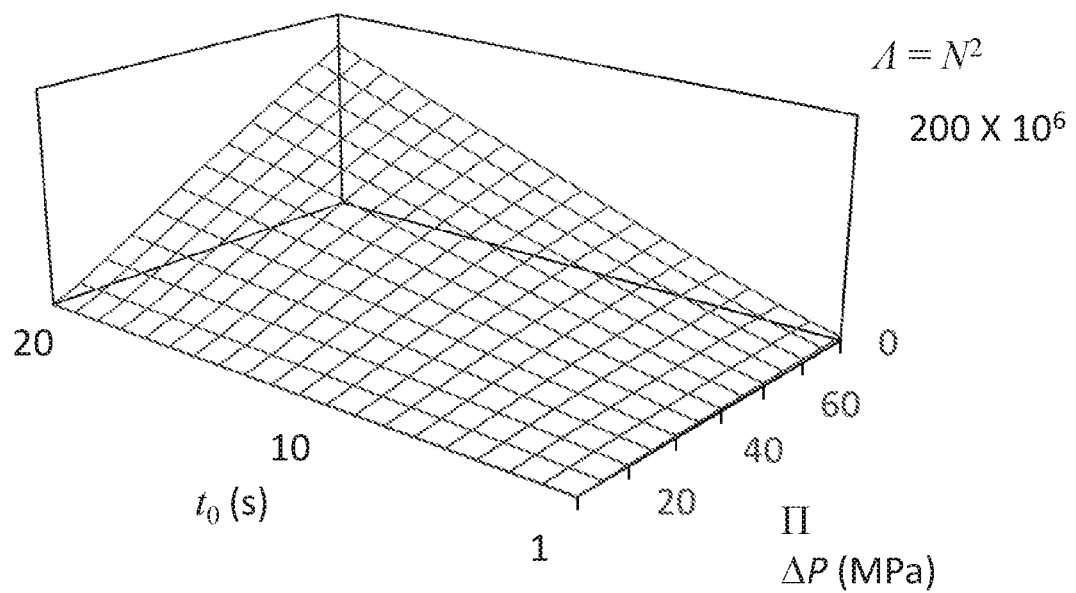
FIG. 29 is a diagram showing a three-dimensional graph of a square theoretical plate number Λ.
Figure 30:
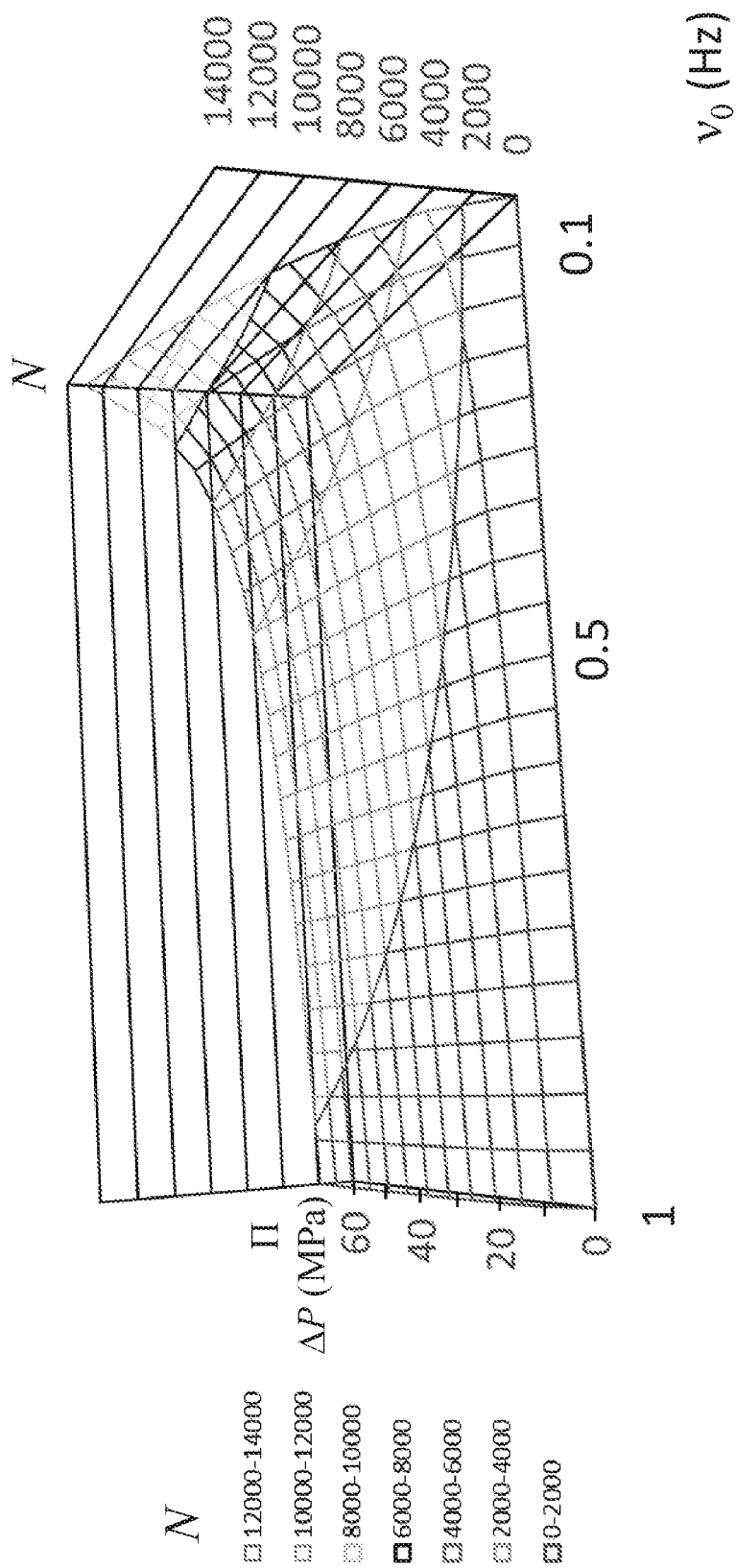
FIG. 30 is a diagram showing a three-dimensional graph of an inverse hold-up time $v_0$.
Figure 31:
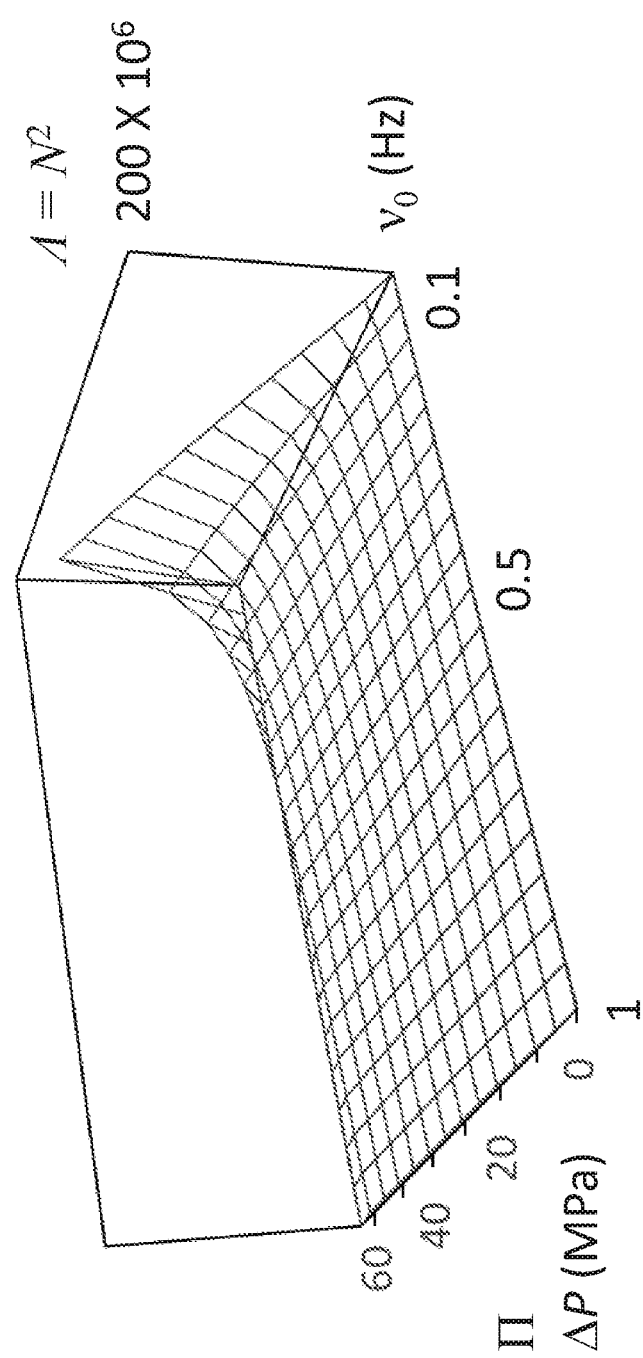
FIG. 31 is a diagram showing a three-dimensional graph of Λ and $v_0$.
Figure 32:
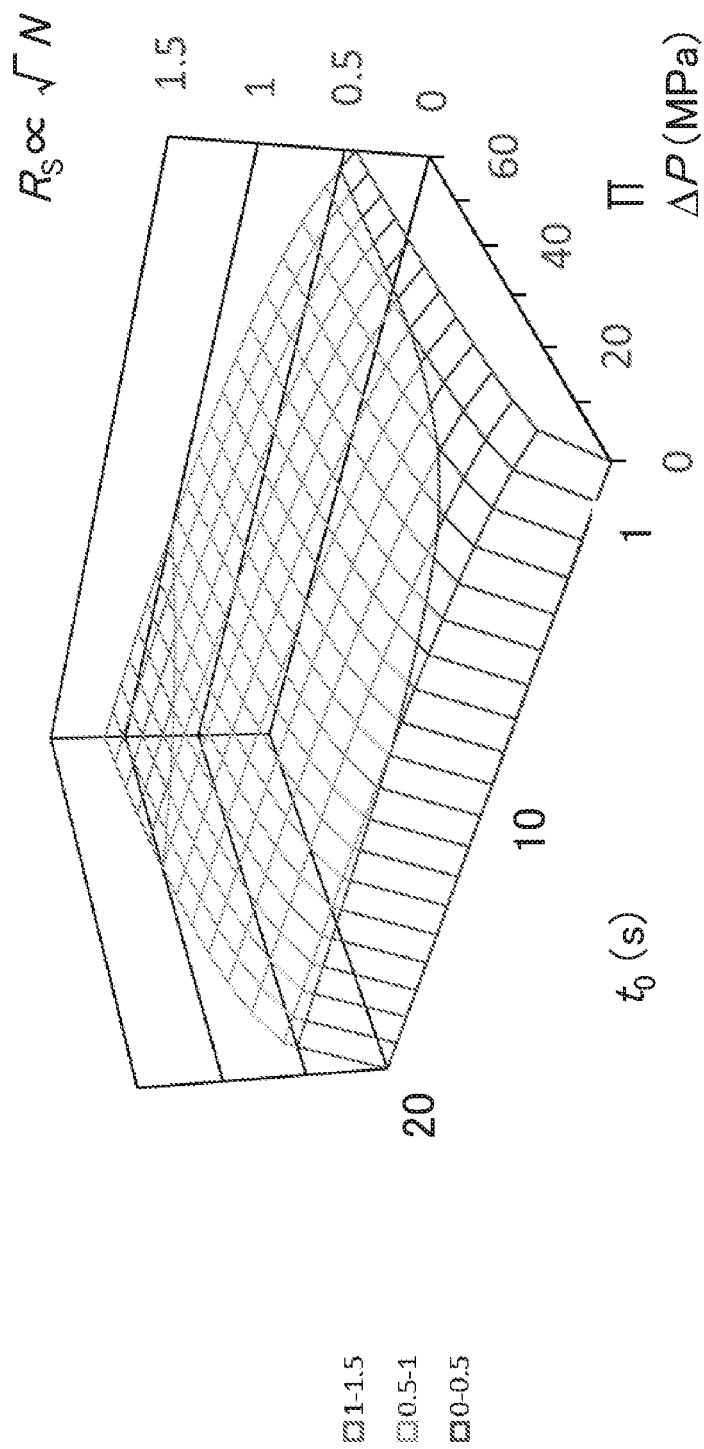
FIG. 32 is a diagram showing a three-dimensional graph of resolution Rs.

The three-dimensional graphs are $\Lambda (\Pi, t_0)$ in FIG. 29, N $(\Pi, v_0)$ in FIG. 30, and $\Lambda (\Pi, v_0)$ in FIG. 31.

Commercial columns have discrete L such as 50 mm, 100 mm, and 150 mm. The variable of the present disclosure is a continuous real number representation, but in reality will be optimized with discrete L. However, the basic idea will follow even in practical application.

The present disclosure is not limited to the above embodiments, but it goes without saying that it extends to various modifications and equivalents included in the spirit and scope of the present invention.

LIST OF NUMERAL REFERENCES

1 Liquid chromatography apparatus
1210A Eluent (mobile phase)
1210B Eluent (mobile phase)
1220 pump
1220A Pump
1220B Pump
1230 Mixer
1240 Autosampler
1250 Column oven
1260 Analytical column
1270 Detector
1280 Cell
1290 Waste liquid tank
1350 Controller
1360 Data processor
1370 Input unit
1380 Output unit

What is claimed is:
1. A chromatographic data system processing apparatus, comprising:
 a liquid feeder configured to feed a mobile phase;
 a sample injector configured to inject a sample into a mobile phase flowing path into which the mobile phase is fed;
 a column configured to separate analytes from the injected sample;
 a detector configured to detect the separated analytes;
 a controller programmed to process a detected result of the detector; and
 a data processor programmed to examine and set operations of the liquid feeder, the column and the detector, and a measurement condition, wherein the data processor generates a three-dimensional graph having three axes related to a pressure, a time, and a number of theoretical plates based on data or variables indicating a relationship between the number of theoretical plates and a flow rate, and data or variables indicating a relationship between the pressure and the flow rate to analyze a separation condition from the generated three-dimensional graph.
2. The chromatographic data system processing apparatus according to claim 1, wherein the data processor axially transforms at least one of the pressure and the time related to two axes out of the three axes to at least one of the flow rate and a length.

3. The chromatographic data system processing apparatus according to claim 1,
wherein the data processor represents at least one axis out of the three axes using a logarithm.

4. The chromatographic data system processing apparatus according to claim 3,
wherein the data processor transforms an axis in logarithmic representation to an axis in antilogarithm representation.

5. The chromatographic data system processing apparatus according to claim 1,
wherein the data processor transforms the three-dimensional graph having the three axes related to the pressure, the time and the number of theoretical plates to a different three-dimensional graph of three axes related to the flow rate, a length and the number of theoretical plates.

6. The chromatographic data system processing apparatus according to claim 1,
wherein the data processor transforms a two-dimensional graph having two axes related to the pressure and the time out of the three axes to a different two-dimensional graph having two axes related to the flow rate and a length.

7. The chromatographic data system processing apparatus according to claim 1,
wherein the data processor selects arbitrary two variables from four variables related to the pressure, the time, the flow rate and a length, and transforms a two-dimensional graph having two axes related to the selected variables to a different two-dimensional graph having two axes related to two variables not selected.

8. The chromatographic data system processing apparatus according to claim 7,
wherein the data processor selects two variables from the four variables, and outputs a partial differential coefficient in a function such as the number of theoretical plates having the two selected variables as variables.

9. The chromatographic data system processing apparatus according to claim 8,
wherein the data processor outputs a dimensionless efficiency standardized with using the variable to be partially differentiated based on the partial differential coefficient.

10. The chromatographic data system processing apparatus according to claim 9,
wherein the data processor outputs a new efficiency by multiplication and division calculation with using two or more of the dimensionless efficiencies to be output.

11. The chromatographic data system processing apparatus according to claim 1,
wherein the data processor uses:
a linear velocity, or a reciprocal thereof as the flow rate;
a column length, or a reciprocal thereof as the length;
a column pressure drop, a velocity length product or pressure-driven strength, or a reciprocal thereof as the pressure;
a hold-up time or a retention time, or a reciprocal thereof as the time; and
a square theoretical plate number, a theoretical plate equivalent height, a square theoretical plate equivalent height, a resolution, a separation impedance, an impedance time or a plate time, or a reciprocal thereof as the number of theoretical plates.

12. A chromatographic data system processing apparatus, comprising:
a liquid feeder configured to feed a mobile phase;
a sample injector configured to inject a sample into a mobile phase flowing path into which the mobile phase is fed;
a column configured to separate the injected sample;
a detector configured to detect the separated analytes;
a controller configured to process a detected result of the detector; and
a data processor configured to examine and set operations of the liquid feeder, the column and the detector, and a measurement condition,
wherein, during a process of selecting two variables for axes from four variables related to a linear velocity, a length, a pressure and a time to analyze a separation condition, the data processor is programmed to transform the axes of the selected two variables into axes of two variables not selected.

13. A chromatographic data system processing apparatus that analyzes and processes data of an analysis condition and a detection result of a chromatograph,
wherein the chromatographic data system processing apparatus is programmed to output a three-dimensional graph having three axes related to a pressure, a time, and a number of theoretical plates based on data or variables indicating a relationship between the number of theoretical plates and a flow rate, and data or variables indicating a relationship between the pressure and the flow rate, and is thereby programmed to analyze a separation condition from the output three-dimensional graph.

* * * * *